US012239269B2

(12) United States Patent
Phillips et al.

(10) Patent No.: US 12,239,269 B2
(45) Date of Patent: Mar. 4, 2025

(54) SUCTION HEAD FOR AN EXTRACTION CLEANER INCLUDING A PIEZOELECTRIC ELEMENT

(71) Applicant: BISSELL Inc., Grand Rapids, MI (US)

(72) Inventors: Ryan Phillips, Grand Rapids, MI (US); Morgan Tolles, Hastings, MI (US); Todd VanTongeren, Ada, MI (US); James T. Hotary, Holland, MI (US)

(73) Assignee: BISSELL Inc., Grand Rapids, MI (US)

( * ) Notice: Subject to any disclaimer, the term of this patent is extended or adjusted under 35 U.S.C. 154(b) by 0 days.

(21) Appl. No.: 18/232,228

(22) Filed: Aug. 9, 2023

(65) Prior Publication Data

US 2024/0090732 A1 Mar. 21, 2024

Related U.S. Application Data

(60) Provisional application No. 63/396,736, filed on Aug. 10, 2022.

(51) Int. Cl.
*A47L 11/40* (2006.01)
*A47L 11/30* (2006.01)
(Continued)

(52) U.S. Cl.
CPC ........... *A47L 11/4008* (2013.01); *A47L 11/30* (2013.01); *A47L 11/34* (2013.01); *A47L 11/4016* (2013.01);
(Continued)

(58) Field of Classification Search
CPC ........ A47L 9/0483; A47L 9/0626; A47L 9/02; A47L 9/04; A47L 9/28; A47L 9/2897;
(Continued)

(56) References Cited

U.S. PATENT DOCUMENTS 2,072,689 A * 3/1937 Smellie ................. A47L 9/2842 15/377
3,497,898 A * 3/1970 Sawyer ................. A47L 11/408 68/3 R
(Continued)

FOREIGN PATENT DOCUMENTS

CN 102283617 A * 12/2011
CN 108158493 A * 6/2018 ............... A47L 9/00
(Continued)

OTHER PUBLICATIONS

Translation of JP 2018099157 A (Year: 2018).*
(Continued)

*Primary Examiner* — David S Posigian
*Assistant Examiner* — Steven Huang
(74) *Attorney, Agent, or Firm* — Price Heneveld LLP

(57) ABSTRACT

A suction head for an extraction cleaner including a base forming a suction chamber and a suction outlet in fluid communication with the suction chamber; and a piezoelectric element coupled to the base, the piezoelectric element comprising a first surface open to the suction chamber, a second surface facing an external environment away from the suction chamber, a thickness between the first surface and the second surface, and a through-via through the thickness open at both the first surface and the second surface. An extraction cleaner including the suction head.

20 Claims, 23 Drawing Sheets

(51) Int. Cl.
*A47L 11/34* (2006.01)
*B06B 1/06* (2006.01)

(52) U.S. Cl.
CPC ....... *A47L 11/4044* (2013.01); *A47L 11/4083* (2013.01); *A47L 11/4088* (2013.01); *B06B 1/0622* (2013.01); *B06B 1/0651* (2013.01); *B06B 2201/77* (2013.01)

(58) Field of Classification Search
CPC .... A47L 11/405; A47L 11/29; A47L 11/4044; A47L 11/30; A47L 11/34; A47L 11/4016; A47L 11/4083; A47L 11/4088; A47L 7/0004; A47L 7/0009; A47L 7/0014; A47L 7/0085; A47L 7/009; B06B 1/0622; B06B 1/0651; B06B 2201/77; F26B 5/02; F26B 21/00; F26B 21/001; F26B 21/008
USPC ........................................ 15/379; 34/92, 164
See application file for complete search history.

(56) References Cited

U.S. PATENT DOCUMENTS

| | | | | |
|---|---|---|---|---|
| 4,816,144 | A * | 3/1989 | Monteith | B07B 1/42 366/127 |
| 10,653,284 | B2 | 5/2020 | Scholten et al. | |
| 10,827,892 | B2 | 11/2020 | Krebs et al. | |
| 2005/0278892 | A1 * | 12/2005 | Bosses | A47L 9/0072 15/364 |
| 2007/0079470 | A1 | 4/2007 | Rippl et al. | |
| 2018/0333736 | A1 * | 11/2018 | Krebs | A47L 5/365 |
| 2019/0365166 | A1 | 12/2019 | Chao | |
| 2022/0354333 | A1 | 11/2022 | Krebs | |
| 2024/0210107 | A1 * | 6/2024 | Bhamla | F26B 5/12 |

FOREIGN PATENT DOCUMENTS

| | | | | | |
|---|---|---|---|---|---|
| EP | 3595503 | B1 | | 7/2023 | |
| GB | 2225933 | A | * | 6/1990 | A47L 9/281 |
| JP | 2018057622 | A | | 4/2018 | |
| JP | 2018099157 | A | * | 6/2018 | |
| JP | 2020146173 | A | * | 9/2020 | A47L 11/24 |

OTHER PUBLICATIONS

Translation of CN 108158493 A (Year: 2018).*
Translation of JP 2020146173 A (Year: 2020).*
Translation of CN 102283617 A (Year: 2011).*

* cited by examiner

SUCTION HEAD FOR AN EXTRACTION CLEANER INCLUDING A PIEZOELECTRIC ELEMENT

CROSS-REFERENCE TO RELATED APPLICATION

This application claims the benefit of U.S. Provisional Patent Application No. 63/396,736, filed 10 Aug. 2022, which is incorporated herein in its entirety.

FIELD OF THE DISCLOSURE

This disclosure pertains to extraction cleaners and, more particularly, to a suction head for extraction cleaners that incorporates a piezoelectric element to facilitate drying.

BACKGROUND

Carpets are a popular floor covering choice to improve comfort, aesthetics, and insulation of a room. Foot and animal traffic on the carpet deposits dirt, stains, and other debris onto and into the carpet. Carpets can include fibers, and the dirt, stains, pet dander, and other debris (hereinafter, collectively "dirt") become deeply embedded into the fibers. Other fabric-presenting products such as rugs, drapes, and upholstery on furniture become similarly dirtied.

Extraction cleaners, both of the upright and portable varieties, have been developed to clean carpets and other fabric-presenting products (hereinafter, collectively "fabric-presenting products") by removing the deeply embedded dirt. The extraction cleaners typically cause a cleaning solution to be deposited upon the fabric-presenting product. The cleaning solution extracts at least a portion of the deeply embedded dirt. The extraction cleaners then extract, typically via suction, the cleaning solution with the deeply embedded dirt from the fabric-presenting product. The fabric-presenting product is thus cleaner than before.

However, there are several problems. First, there is a problem in that the extraction cleaners sometimes extract a suboptimal percentage of the cleaning fluid from the fabric-presenting product. That is a problem because some of the dirt that the cleaning solution extracted from the fabric-presenting product remains upon or within the fabric-presenting product. Further, that is a problem because the fabric-presenting product takes a suboptimal time to dry. Second, there is a problem in that extraction of the cleaning solution from the fabric-presenting product can generate a suboptimal level of noise. That is a problem because some users may dislike what they perceive as loud noise, or circumstances may otherwise be better suited to a relatively quiet environment (e.g., a baby is napping).

SUMMARY

The present disclosure addresses those problems with a suction head for an extraction cleaner that includes a piezoelectric element (or a plurality of piezoelectric elements) and places the piezoelectric element in contact with a fabric-presenting product that is a target of a drying operation, such as that which might follow from a cleaning operation using the same suction head. The piezoelectric element, when activated, vibrates at a high frequency. The vibrations releases liquid from the fabric-presenting product that suction alone typically cannot capture and micronizes the liquid, which then either floats away with room currents or is captured via suction through a fluid flow path within the suction head that leads to a storage container of the extraction cleaner. A suction source of the extraction cleaner can be operated at a relatively low power to create the suction to capture the micronized liquid. The relative low power generates relatively low audible noise.

According to an aspect of the present disclosure, a suction head for an extraction cleaner comprises: (a) a base forming a suction chamber and a suction outlet in fluid communication with the suction chamber; and (b) a piezoelectric element coupled to the base, the piezoelectric element comprising a first surface open to the suction chamber, a second surface facing an external environment away from the suction chamber, a thickness between the first surface and the second surface, and a through-via through the thickness open at both the first surface and the second surface.

According to another aspect of the present disclosure, an extraction cleaner comprises: (a) a main housing; (b) a suction source housed in the housing; (c) a first fluid storage container coupled to the main housing, the first fluid storage container configured to hold a fluid; (d) a fluid distributor in fluid communication with the first fluid storage container, the fluid distributor configured to deliver the fluid from the first fluid storage container to a fabric-presenting product; (e) a second fluid storage container coupled to the main housing and in fluid communication with the suction source, the second fluid storage container configured to hold the fluid extracted from the fabric-presenting product; (f) a suction head comprising a base forming a suction chamber and a suction outlet in fluid communication with the suction chamber, the second fluid storage container, and the suction source; and a piezoelectric element coupled to the base, the piezoelectric element comprising (i) a first surface open to the suction chamber, (ii) a second surface facing an external environment away from the suction chamber, (iii) a thickness between the first surface and the second surface, and (iv) a through-via through the thickness open at both the first surface and the second surface; and (g) an activated state during which (i) the piezoelectric element and the suction source are activated and (ii) fluid flows from an external environment, through the through-via of the piezoelectric element, through the suction chamber of the base of the suction head, and into the second fluid storage container.

Figure 1:
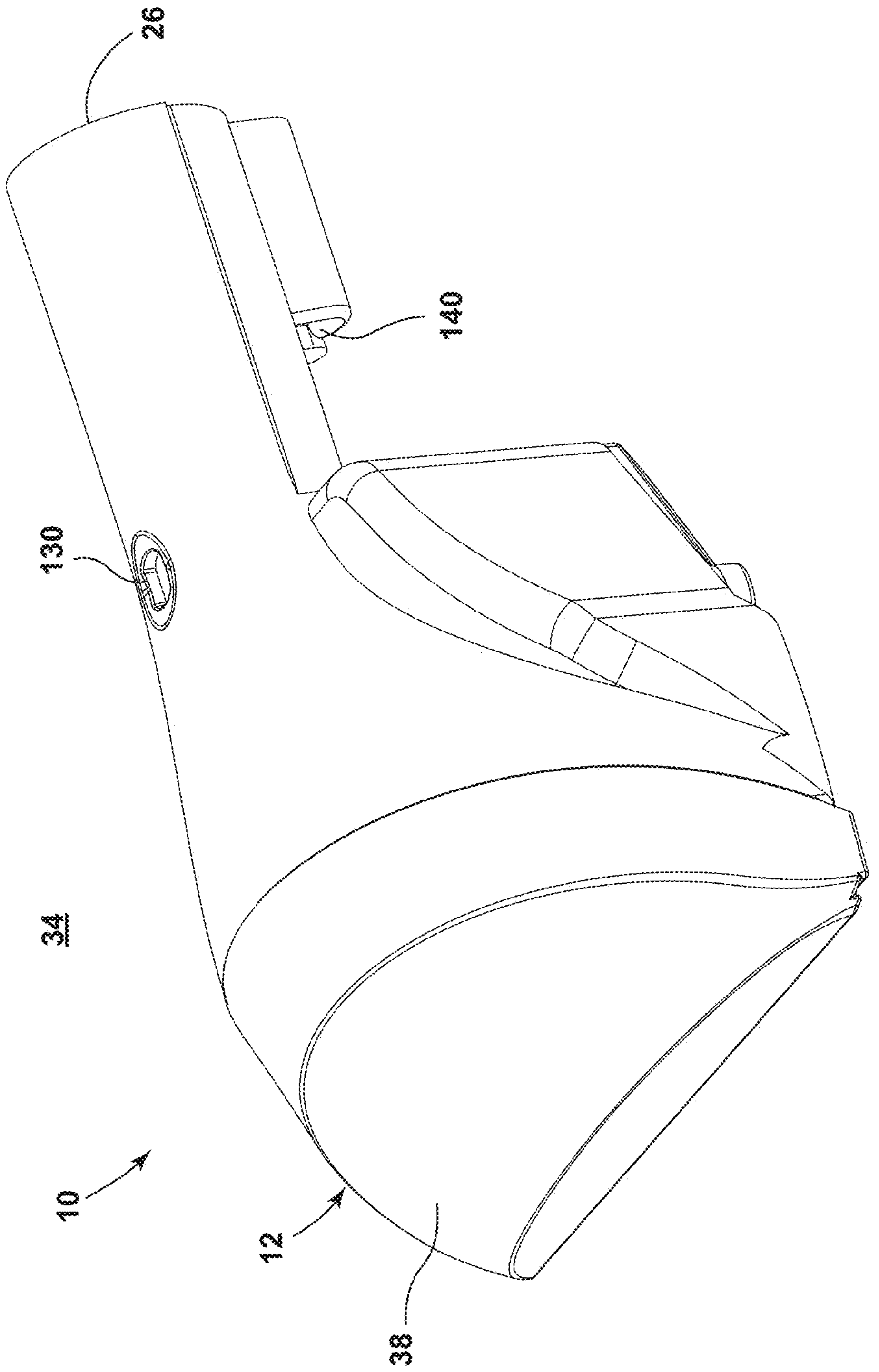
FIG. 1 is an overhead perspective view of a suction head of the present disclosure, illustrating the suction head including a fluid distributor to distribute fluid on a fabric-presenting product.
Figure 2:
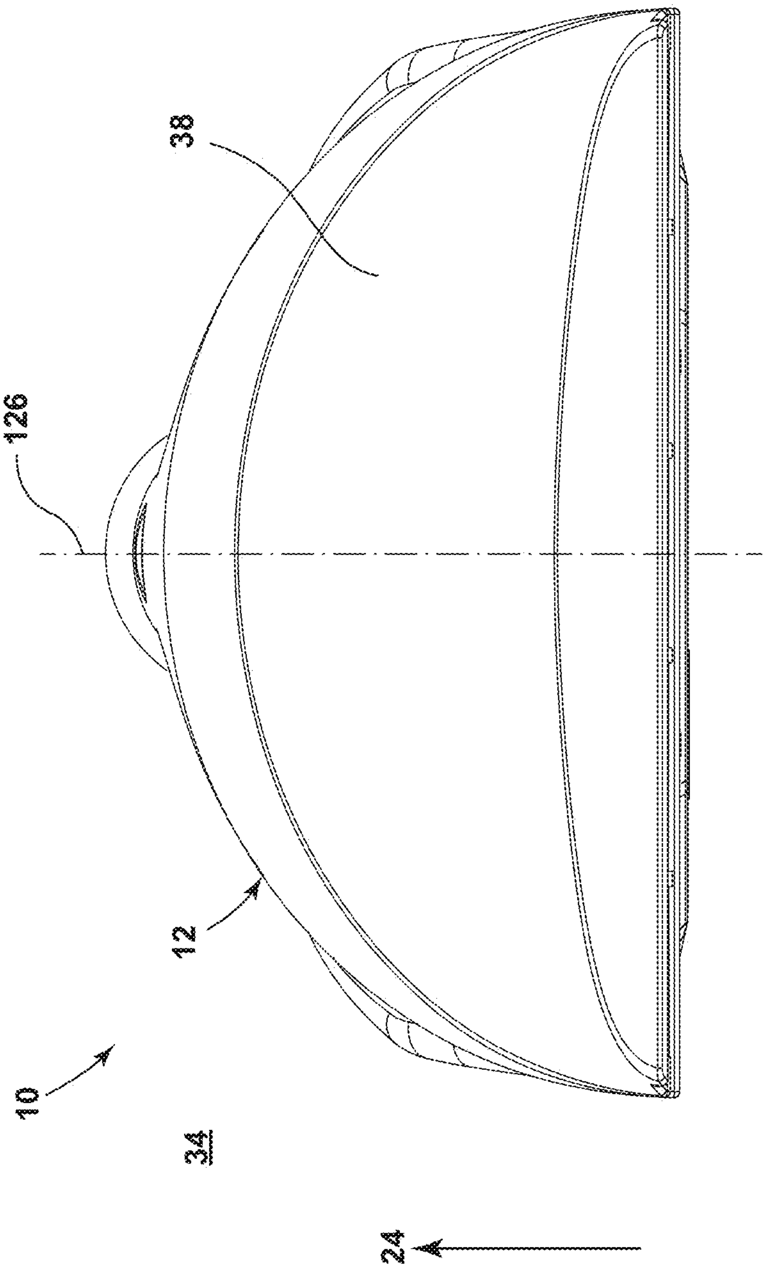
FIG. 2 is a front elevation view of the suction head of FIG. 1, illustrating a conceptual midline dividing the suction head into two relatively symmetrical halves.

The drawings described herein are for illustrative purposes only, are schematic in nature, and are intended to be exemplary rather than to limit the scope of the disclosure.

DETAILED DESCRIPTION

Referring to FIGS. 1-6, a suction head 10 includes a base 12 and a piezoelectric element 14 coupled to the base 12. The base 12 forms a suction chamber 16. For example, the base 12 includes opposing inner surfaces 18, 20 (see, e.g., FIG. 6) separated by a distance 22. The opposing inner surfaces 18, 20 can be contiguous. The distance 22 can decrease as position along the opposing inner surfaces 18, 20 moves in an upward direction 24. The base 12 further forms a suction outlet 26. For example, the base 12 includes opposing surfaces 28, 30 separated by a distance 32. The suction outlet 26 can take a tubular shape. The suction outlet 26 is in fluid communication with the suction chamber 16, and both the suction outlet 26 and the suction chamber 16 are in fluid communication with an external environment 34 (e.g., external to the suction head 10). As will be further described, during use of the suction head 10, fluid flows from the external environment 34 into the suction chamber 16, and then from the suction chamber 16 into the suction outlet 26. The base 12 can include a throat 36, where fluid flow is narrowed, demarking a separation between the suction chamber 16 and the suction outlet 26. The base 12 can be formed of plastic such as via injection molding. Other materials are envisioned. The base 12 can be formed of multiple parts coupled together. The base 12 can include one or more visually transparent portions 38 so that the user can see fluid being extracted from the fabric-presenting product during use.

Referring additionally to FIGS. 7-11, the piezoelectric element 14 has a first surface 40 and a second surface 42. At least a portion of the first surface 40 is open to the suction chamber 16. The second surface 42 faces away from the suction chamber 16 and toward the external environment 34. The piezoelectric element 14 further includes a thickness 44 between the first surface 40 and the second surface 42. The piezoelectric element 14 further includes a through-via 46 through the thickness 44. The through-via 46 is open at the first surface 40 and the second surface 42.

The piezoelectric element 14 includes a diaphragm 48 and a piezoelectric material 52 disposed on the diaphragm 48. The piezoelectric material 52 can be as quartz or lead zirconate titanate, although any piezoelectric material 52 suitable for the purposes described herein can be utilized. The piezoelectric material 52 can have an annular shape, as illustrated, although other shapes such as ring shaped are envisioned. The diaphragm 48 can be formed of stainless steel, although other materials are contemplated. In embodiments, the diaphragm 48 has a diameter 50 within a range of from 15 mm to 25 mm, such as about 20. However, in other embodiments, the diameter 50 is below or above the stated range. The diaphragm 48 provides the first surface 40 and the second surface 42, and the through-via 46 is through the diaphragm 48. As mentioned, the piezoelectric material 52 is disposed on the first surface 40 of the diaphragm 48. The piezoelectric element 14 further includes electrodes 51 to receive lead wires 53 in order to provide a voltage to the piezoelectric material 52 when activated. The voltage causes the piezoelectric material 48 to undergo mechanical deformation. Rapidly changing the voltage thus causes the piezoelectric material 52, and thus the diaphragm 48, to vibrate. In embodiments, the piezoelectric material 52 vibrates at a frequency within a range of from 50 kHz to 200 kHz, such as from 100 kHz to 120 kHz. However, in other embodiments, the frequency at which the piezoelectric material 52 vibrates is below or above the stated range.

In embodiments, the piezoelectric element 14 includes a plurality of through-vias 46, of which the through-via 46 is one. In other words, the through-via 46 is one of the plurality of through-vias 46. Each of the plurality of through-vias 46 are through the thickness 44 of the diaphragm 48. Each of the plurality of through-vias 46 are open at both the first surface 40 and the second surface 42. Each of the plurality of through-vias 46 can be formed via laser perforation methods, although other ways may be possible. In embodiments, the plurality of through-vias 46 number within a range of from 1,000 to 2,000, although the number of the plurality of through-vias 46 could be more or less than the stated range. In embodiments, each of plurality of through-vias 46 of the piezoelectric element 14 has a diameter 54 (see FIG. 11) that is within a range of from 5 μm to 20 μm. However, in other embodiments, the diameter 54 may be outside of that range.

Figure 20:
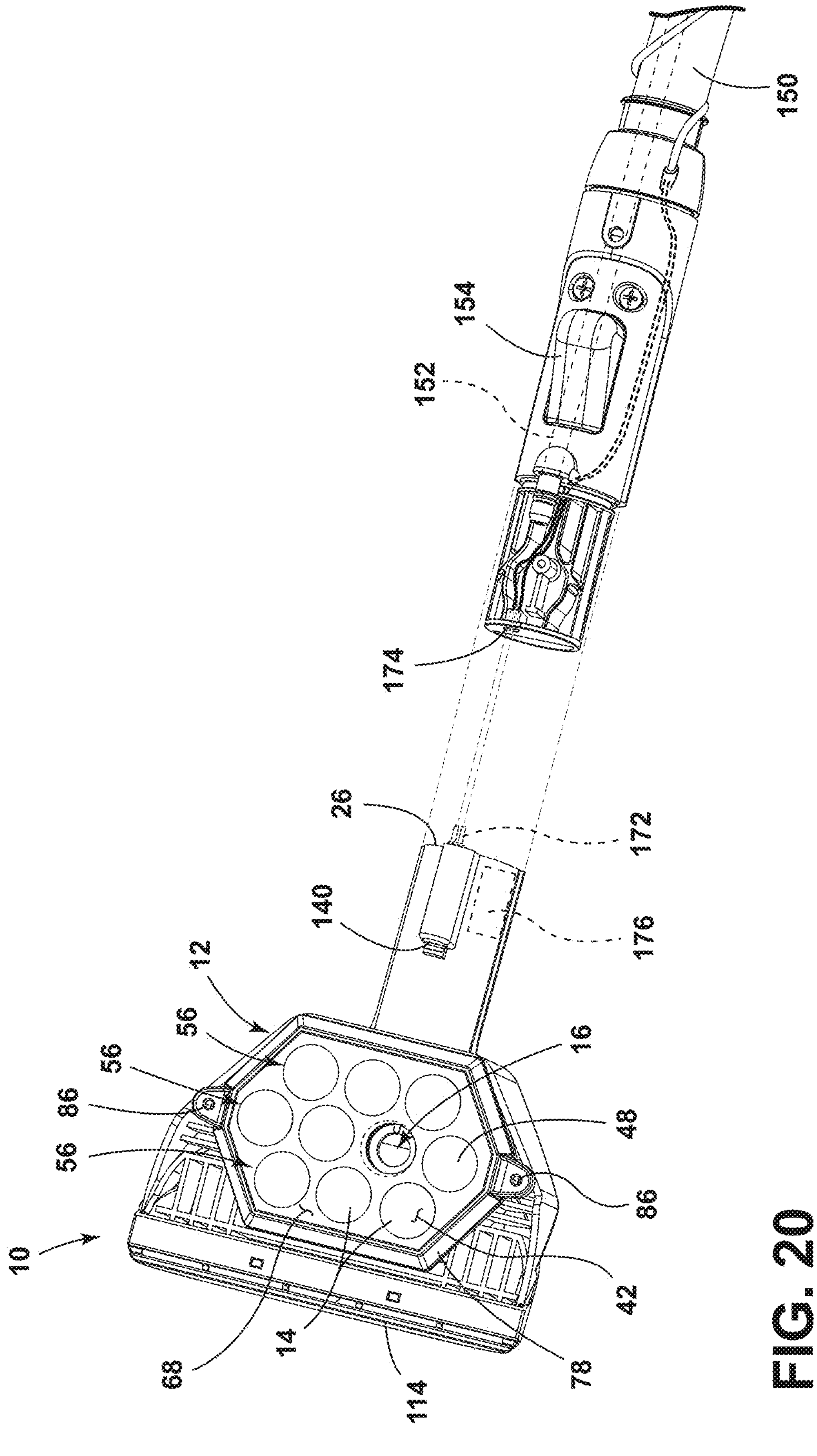
FIG. 20 is a perspective view illustrating how the suction head of FIG. 1 attaches to the flexible hose of the extraction cleaner of FIG. 16.

In embodiments, the suction head 10 includes a plurality of piezoelectric elements 14 coupled to the base 12. The piezoelectric element 14 already discussed is one of the plurality of piezoelectric elements 14. Each of the plurality of piezoelectric elements 14 can be identical to the piezoelectric element 14 already discussed. For example, each of the plurality of piezoelectric elements 14 provides the first surface 40 open to the suction chamber 16, the second surface 42 facing the external environment 34 and away from the suction chamber 16, the thickness 44, and the plurality of through-vias 46 through the thickness 44. The number of through-vias 46, the diameter 54 of the through-vias 46, the diameter 50 of the diaphragm 48, and the frequency at which the piezoelectric material 52 vibrates for each of the plurality of piezoelectric elements 14 can be substantially the same (e.g., the same within manufacturing tolerances). In some instances, the plurality of piezoelectric elements 14 numbers within a range of from 5 to 15. However, the number of piezoelectric elements 14 forming the plurality of piezoelectric elements 14 is not particularly limited. In the illustrated embodiment, the plurality of piezoelectric elements 14 are arranged in rows 56 (see, e.g., FIGS. 5 and 20) of piezoelectric elements 14, where a line 58 extending through centers 60 of the piezoelectric elements 14 forming any particular row 56 is parallel to a similar line 58 extending through centers 60 of the piezoelectric elements 14 forming any another row 56. In short, the rows 56 can be parallel to each other. More or less rows 56 of piezoelectric elements 14 can be utilized than the three rows 56 in the illustrated embodiment.

Figure 6:
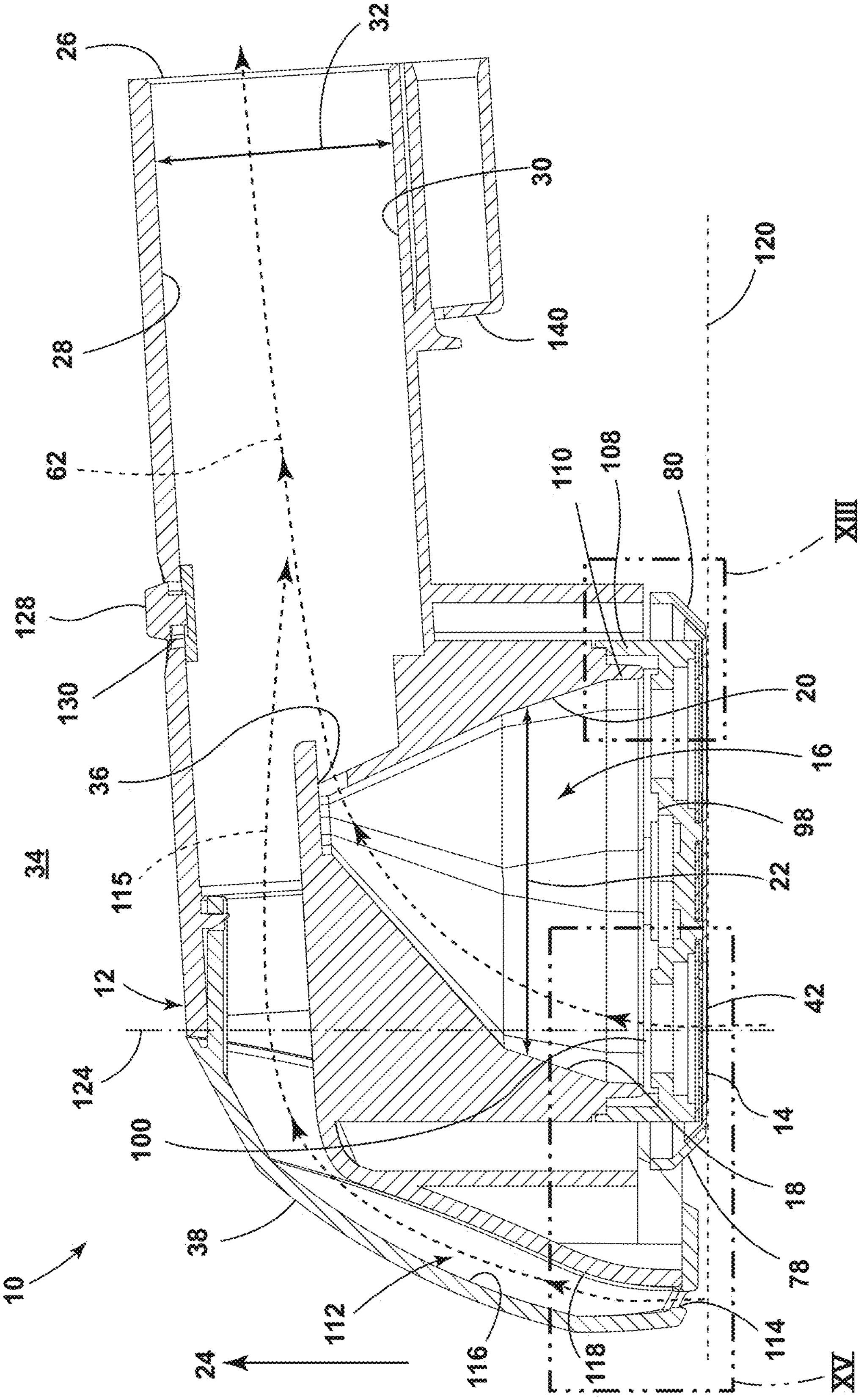
FIG. 6 is an elevation view of a cross-section of the suction head of FIG. 1 taken through line VI-VI of FIG. 5, illustrating the base further providing an inlet into a second suction chamber in communication with the suction outlet, and the base defining (i) a fluid flow path from the external environment, through through-vias through the plurality of piezoelectric elements, through the suction chamber, and out through the suction outlet and (ii) a second fluid path from the external environment, through the inlet, through the second suction chamber, and joining with the fluid flow path out through the suction outlet.
Figure 7:
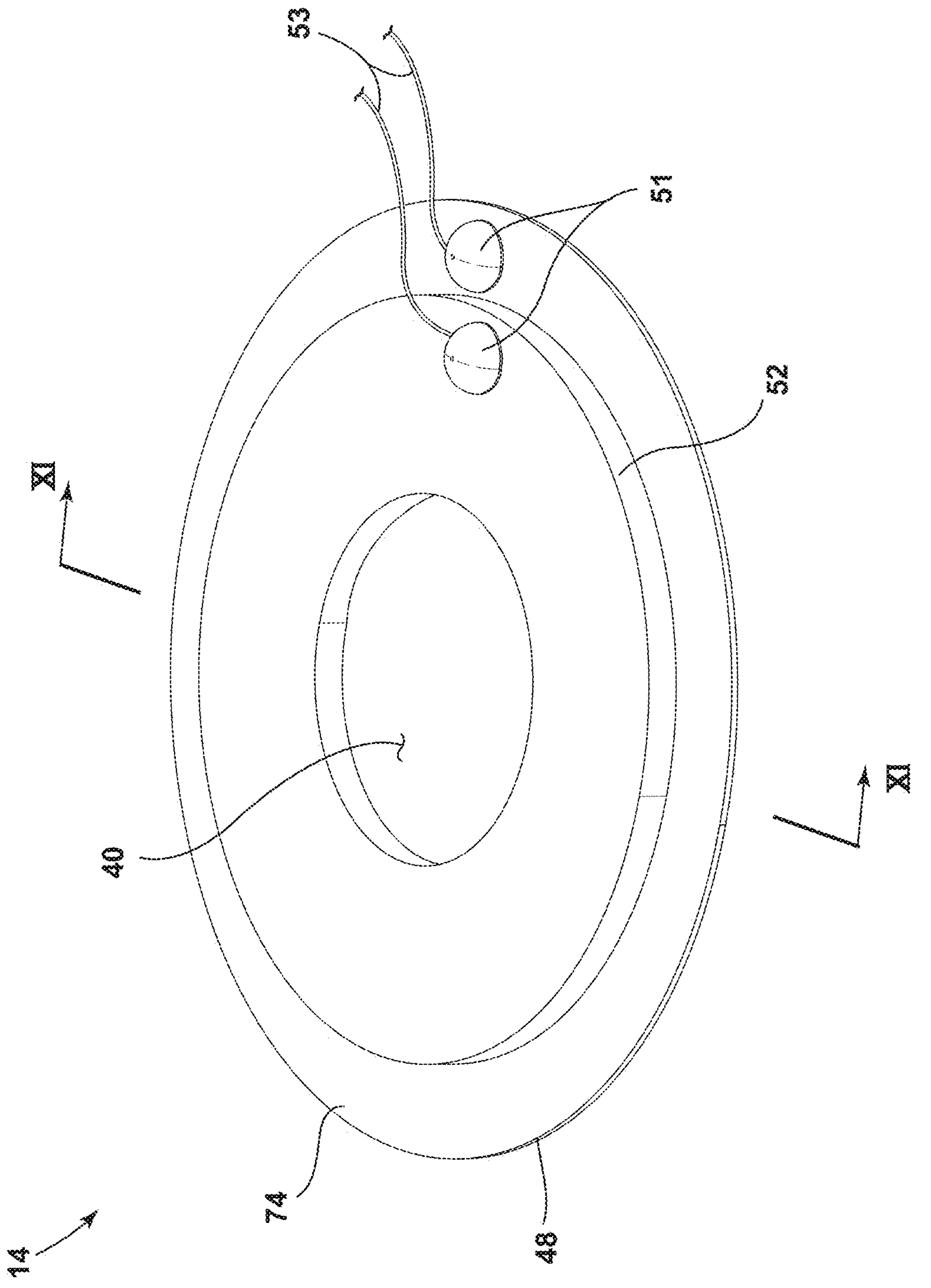
FIG. 7 is an overhead perspective view of the piezoelectric element of the suction head of FIG. 1, illustrating the piezoelectric element including a piezoelectric material having an annular shape disposed upon a diaphragm, such that vibration of the piezoelectric material causes the diaphragm to vibrate as well.
Figure 8:
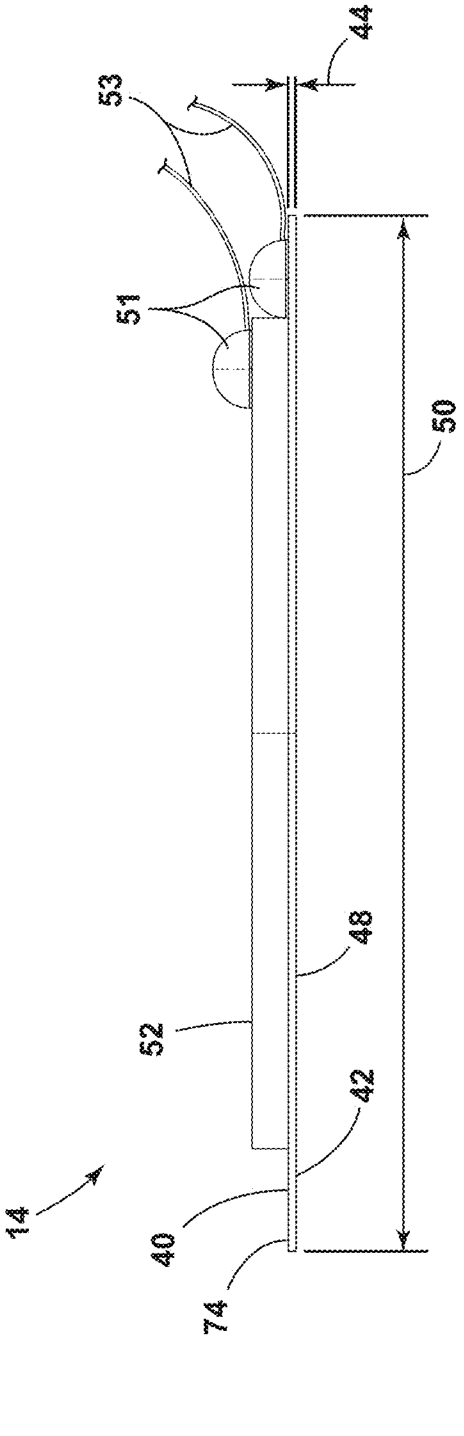
FIG. 8 is an elevation view of the piezoelectric element of FIG. 6, illustrating the diaphragm of the piezoelectric element having a diameter and a thickness.
Figure 9:
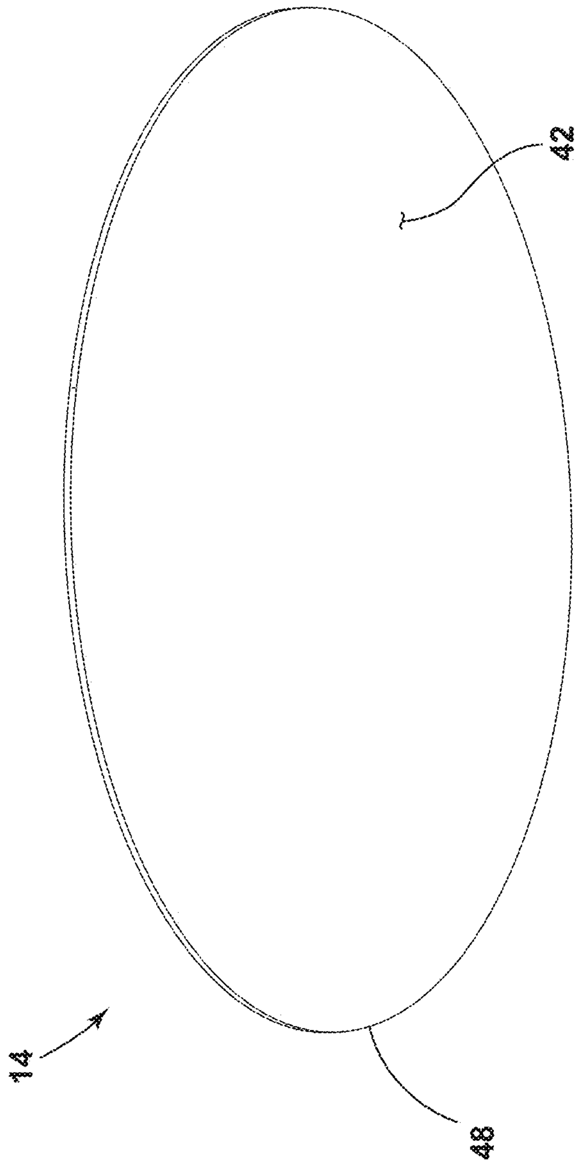
FIG. 9 is a bottom perspective view of the piezoelectric element of FIG. 6, illustrating the diaphragm of the piezoelectric element presenting a second surface that contacts the fabric-presenting product during use.
Figure 10:
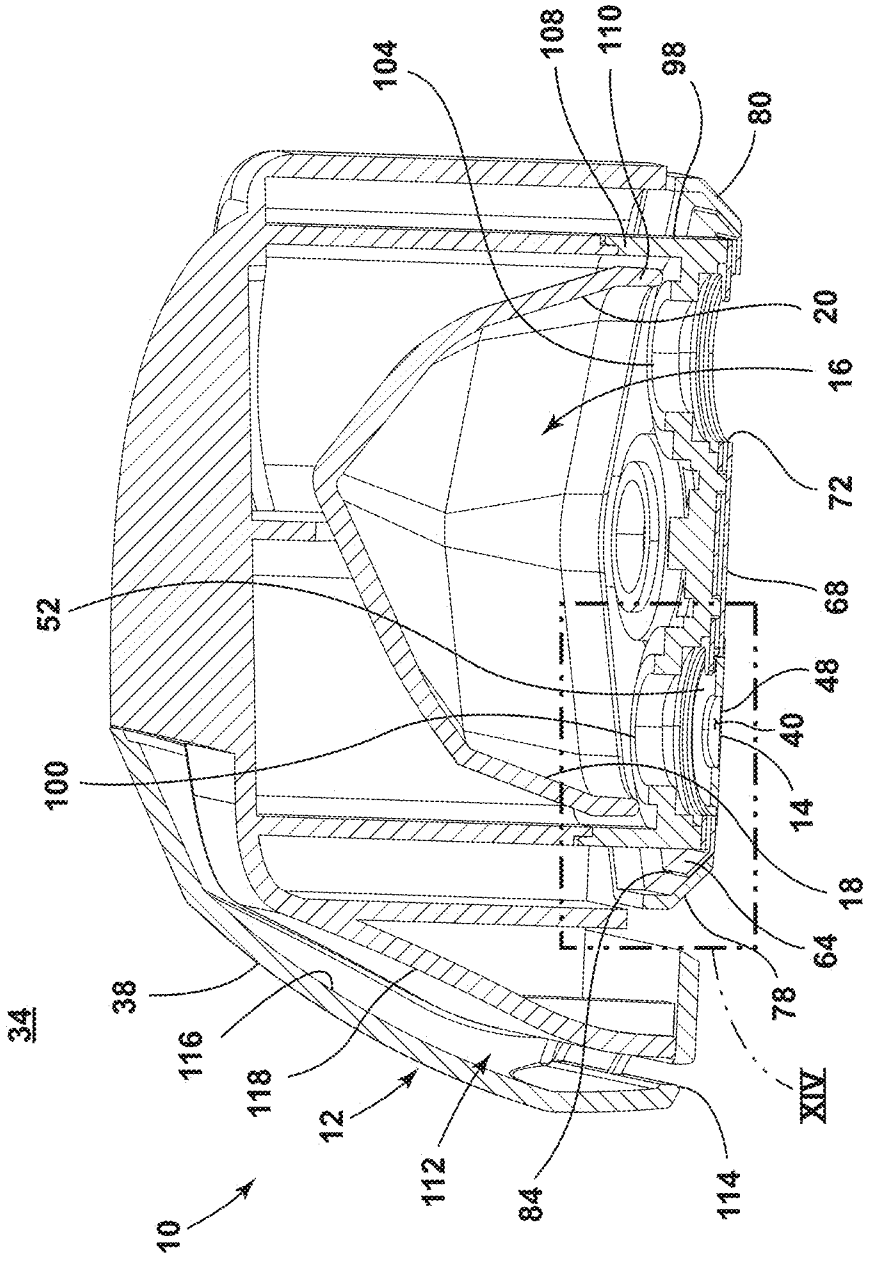
FIG. 10 is an elevation view of a cross-section of the suction head of FIG. 1 taken through line X-X of FIG. 5, illustrating a first surface of the piezoelectric element (provided by the diaphragm thereof) exposed to the suction chamber of the base.
Figure 11:
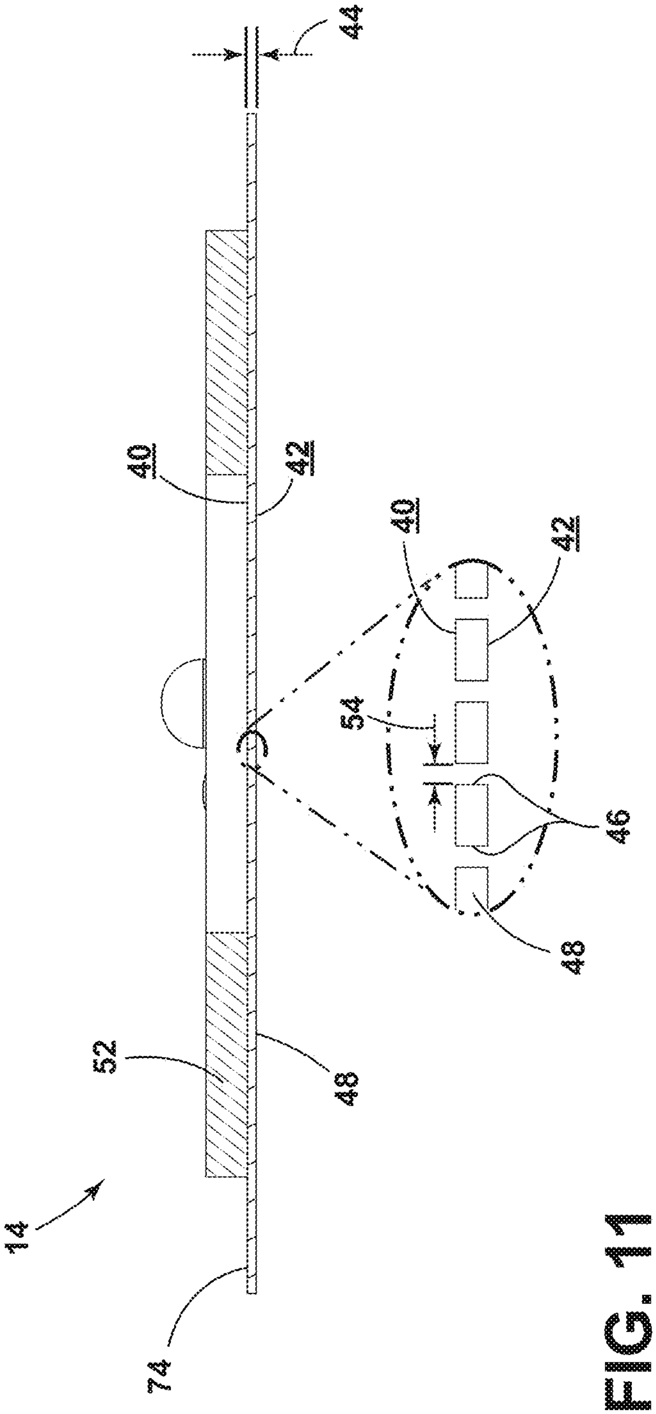
FIG. 11 is an elevation view of a cross-section of the piezoelectric element of FIG. 6 taken through line XI-XI of FIG. 7, illustrating a plurality of through-vias through the thickness of the diaphragm of the piezoelectric element and open at the first surface and the second surface thereof.

The base 12 and the piezoelectric element 14 define a fluid flow path 62 (see, e.g., FIG. 6). The fluid flow path 62 is from the external environment 34, through the through-via 46 of the piezoelectric element 14, into the suction chamber 16, into the suction outlet 26, and then out of the suction outlet 26. In embodiments where the piezoelectric element 14 includes a plurality of through-vias 46 through the diaphragm 48, the fluid flow path 62 is from the external environment 34, through the plurality of through-vias 46 of the piezoelectric element 14, into the suction chamber 16, into the suction outlet 26, and then out of the suction outlet 26. In embodiments where the suction head 10 includes the plurality of piezoelectric elements 14, the flow path is from the external environment 34, through the plurality of through-vias 46 of each of the plurality of piezoelectric elements 14, into the suction chamber 16, into the suction outlet 26, and then out of the suction outlet 26.

Referring additionally to FIGS. 12-15, in embodiments, the suction head 10 further includes a bracket 64 coupled to the base 12. The bracket 64 includes a first surface 66, at least a portion of which faces the suction chamber 16, and a second surface 68 that faces away from the suction chamber 16 toward the external environment 34. The bracket 64 further includes a thickness 70 (see, e.g., FIG. 14) between the first surface 66 and the second surface 68. The bracket 64 further includes an aperture 72 through the thickness 70 that is open at the first surface 66 and the second surface 68.

The aperture 72 accommodates the piezoelectric element 14. For example, an outer region 74 of the first surface 40 of the piezoelectric element 14 (such as the diaphragm 48 provides) lies flush against the second surface 68 of the bracket 64. The outer region 74 may remain unadhered to the second surface 68 of the bracket 64 to facilitate vibration of the diaphragm 48. At least a portion of the piezoelectric element 14, such as the piezoelectric material 52, extends into the aperture 72 of the bracket 64. The aperture 72 of the bracket 64 surrounds the piezoelectric material 52. A portion 76 of the lead wires 53 of the piezoelectric element 14 extend adjacent to the first surface 66 of the bracket 64. The portion 76 of the lead wires 53 extending over the first surface 66 of the bracket 64 while the outer region 74 of the first surface 40 of the piezoelectric element 14 lies flush against the second surface 68 of the bracket 64 together maintain the piezoelectric element 14 within the aperture 72 of the bracket 64 and coupled to the base 12. The bracket 64 can be formed from plastic, such as through injection molding. However, other materials are contemplated. In variations, the diaphragms 48 are integral with the bracket 64 and in such a variation, vibration of the piezoelectric materials 52 causes the bracket 64 to vibrate and the plurality of through-vias 46 are through the bracket 64.

In embodiments of the suction head 10 that include the plurality of piezoelectric elements 14, the bracket 64 includes a plurality of apertures 72 (of which the aperture 72 is one) to accommodate the plurality of piezoelectric elements 14 in the same manner. The features of the aperture 72 of the bracket 64 described above apply as well to each of the plurality of apertures 72. The spatial relationship between the piezoelectric element 14 and the aperture 72 of the bracket 64 described above applies as well to each of the plurality of piezoelectric elements 14 and each of the plurality of apertures 72. Each of the plurality of apertures 72 of the bracket 64 accommodates a different one of the plurality of piezoelectric elements 14.

As in the illustrated embodiment, the suction head 10 can further include an outer bracket 78 attached to the base 12. The outer bracket 78 holds the bracket 64 to the base 12 while maintaining the second surface 42 of the plurality of piezoelectric elements 14 exposed to the external environment 34. In particular, the outer bracket 78 includes a shoulder 80 that surrounds a central aperture 82. The shoulder 80 is angled away relative to the second surface 68 of the bracket 64. An outer flange 84 of the bracket 64 is similarly angled. The outer bracket 78 includes fastener receivers 86 (see FIG. 12) aligned with fastener receivers 88 of the base 12 to receive fasteners (not illustrated) that fasten the outer bracket 78 to the base 12. The bracket 64 is sandwiched between the outer bracket 78 and the base 12, with the shoulder 80 of the outer bracket 78 contacting and shouldering the weight of the outer flange 84 of the bracket 64. The central aperture 82 of the outer bracket 78 allows the second surface 68 of the bracket 64 and the second surface 42 of the piezoelectric element 14 to remain exposed to the external environment 34. The outer bracket 78 can be formed from plastic, such as through injection molding. However, other materials are contemplated.

The suction head 10 can further include a flexible backing 90. The flexible backing 90 takes a sheet-like form and is disposed upon the first surface 66 of the bracket 64. The flexible backing 90 includes an aperture 92 that is aligned with the aperture 72 of the bracket 64 to accommodate the fluid flow path 62 from the through-via 46 (or the plurality of through-vias 46, as the case may be) of the piezoelectric element 14 to the suction chamber 16. The flexible backing 90 further includes a tab 94 extending over the first surface 40 of the piezoelectric element 14 and may contact the piezoelectric material 52 thereof. In embodiments of the suction head 10 including the plurality of piezoelectric elements 14, the flexible backing 90 includes a plurality of apertures 92 (of which the aperture 92 is one). Each of the plurality of apertures 92 accommodates the fluid flow path 62 from a different one of the plurality of piezoelectric elements 14 to the suction chamber 16 in the same manner as described above. The outer flange 84 of the bracket 64 surrounds a perimeter 96 of the flexible backing 90. The flexible backing 90, like the bracket 64, is sandwiched between the outer bracket 78 and the base 12.

The suction head 10 can further include, as in the illustrated embodiment, a backboard 98 that is disposed upon the flexible backing 90, with the flexible backing 90 disposed between the backboard 98 and the bracket 64. The backboard 98, along with the flexible backing 90, is sandwiched between the outer bracket 78 and the base 12. The backboard 98 includes an aperture 100 to accommodate the fluid flow path 62 from the piezoelectric element 14 to the suction chamber 16. The aperture 100 of the backboard 98 is thus aligned with the aperture 92 of the flexible backing 90, the piezoelectric element 14, and the aperture 72 of the bracket 64. The aperture 100 has a diameter 102. The diameter 102 (see FIG. 5) of at least a portion 104 of the aperture 100 is smaller than a diameter 106 of the aperture 72 of the bracket 64. For example, the diameter 102 can decrease in a stepwise manner away from the piezoelectric element 14. The backboard 98, as in the illustrated embodiment, can include an outer wall 108 that extends away from the bracket 64. The outer wall 108 faces a wall of the base 12 at least partially defining the suction chamber 16. The outer wall 108 surrounds a portion 110 of the suction chamber 16. The fluid flow path 62 goes through the aperture 100 of the backboard 98 before entering the suction chamber 16. In embodiments of the suction head 10 that include the plurality of piezoelectric elements 14, the backboard 98 includes a plurality of apertures 100 (of which the aperture 100 is one). Each of the plurality of apertures 100 accommodates the fluid flow path 62 from a different one of the plurality of piezoelectric elements 14 to the suction chamber 16 in the same manner as described above.

Figure 12:
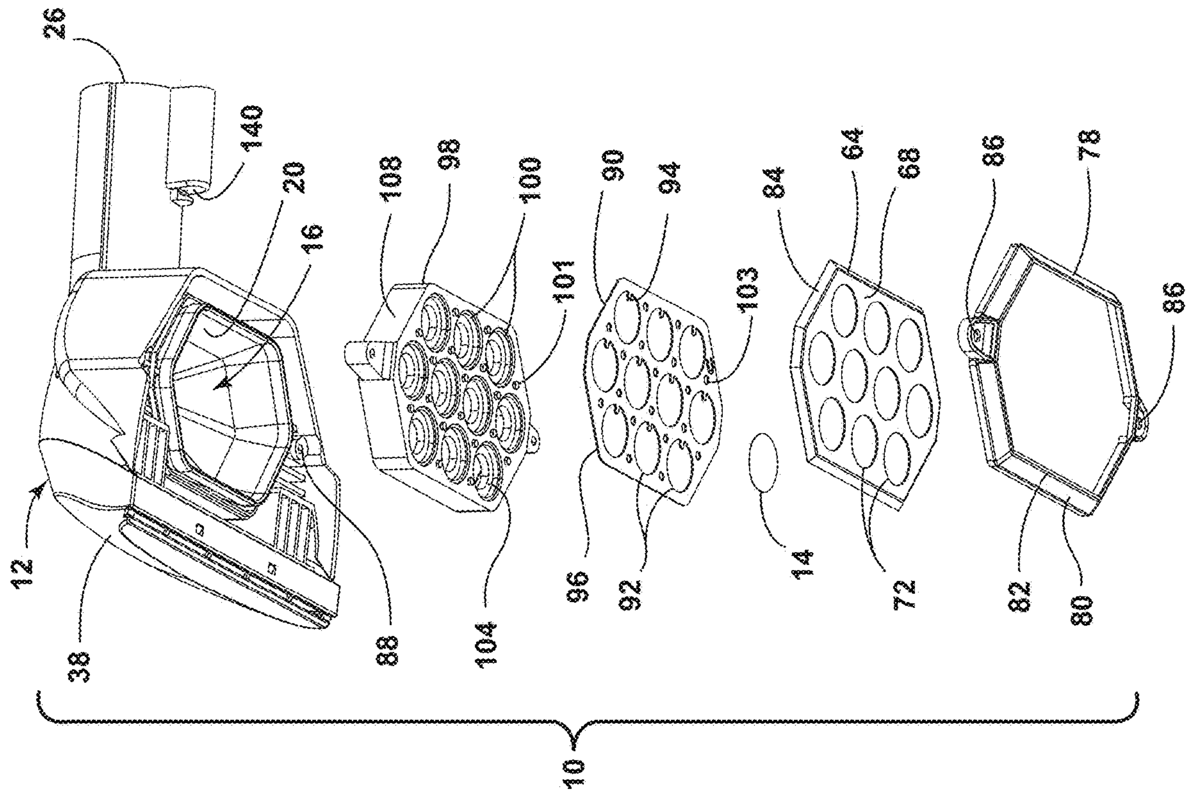
FIG. 12 is a perspective exploded view of the suction head of FIG. 1, illustrating the suction head including a bracket, a flexible backing, and a backboard all with apertures aligned so that the first surface of the diaphragm of each of the plurality of piezoelectric elements are open to the suction chamber, as well as an outer bracket coupling those components to the base (it is noted that only one piezoelectric element is illustrated for simplicity)
Figure 13:
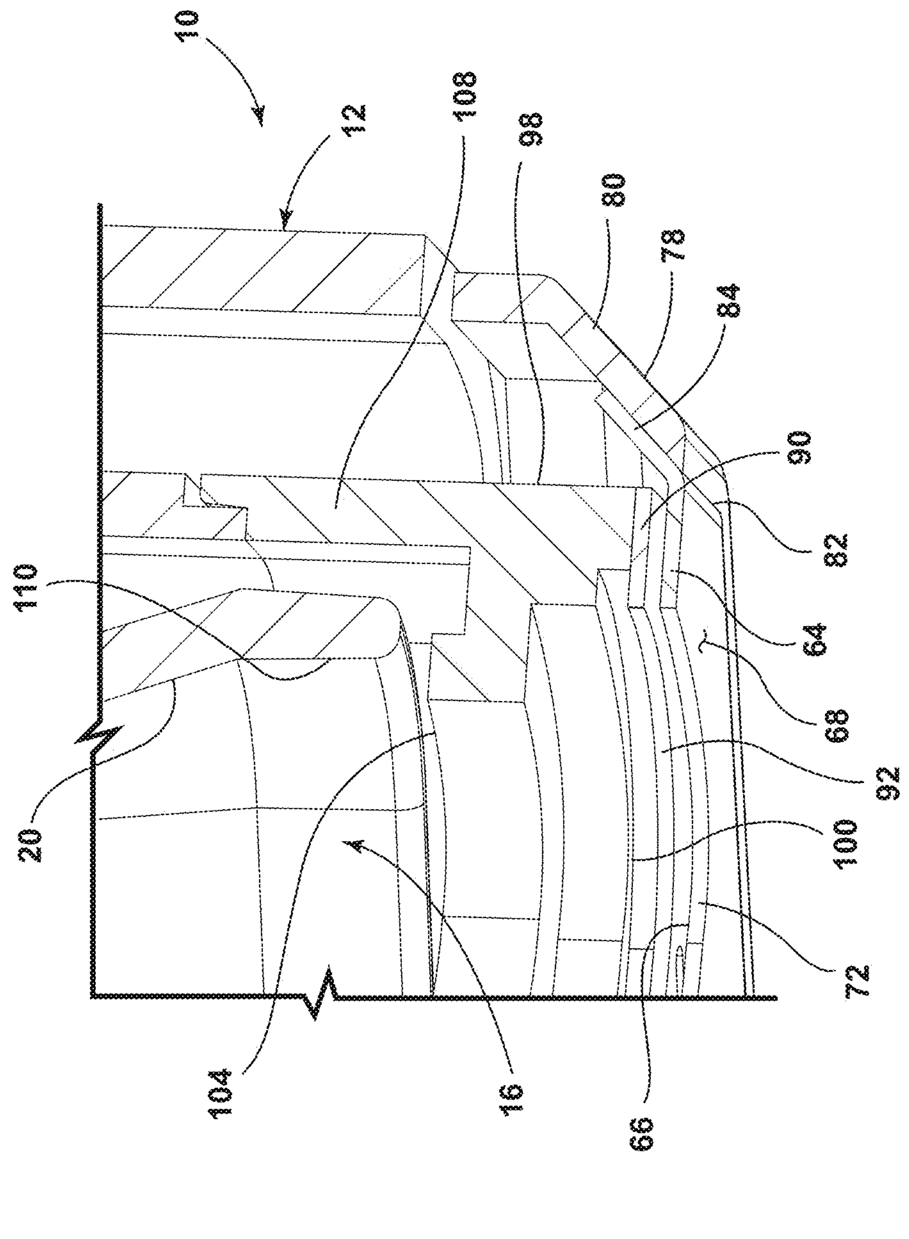
FIG. 13 is a magnified and slight perspective view of area XIII of FIG. 6, illustrating the backboard, the flexible backing, and the bracket sandwiched between the base and the outer bracket (it is noted that the piezoelectric element is not illustrated so that the arrangement of the other components is more easily understood)
Figure 14:
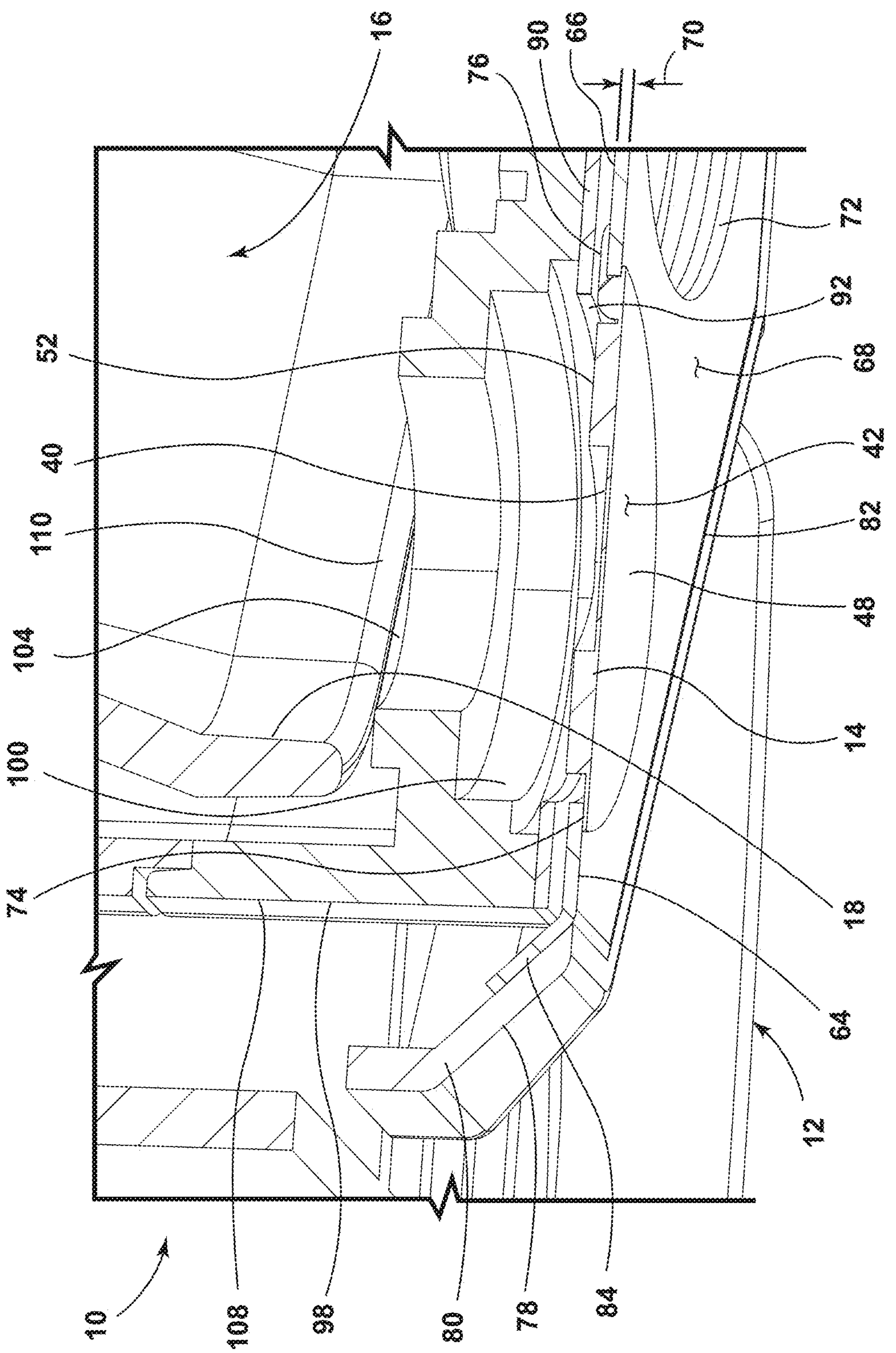
FIG. 14 is a magnified and slight perspective view of area XIV of FIG. 10, illustrating the piezoelectric material of the piezoelectric element extending through the aperture of the bracket and a portion of lead wires of the piezoelectric element sandwiched between the bracket and the flexible backing.
Figure 15:
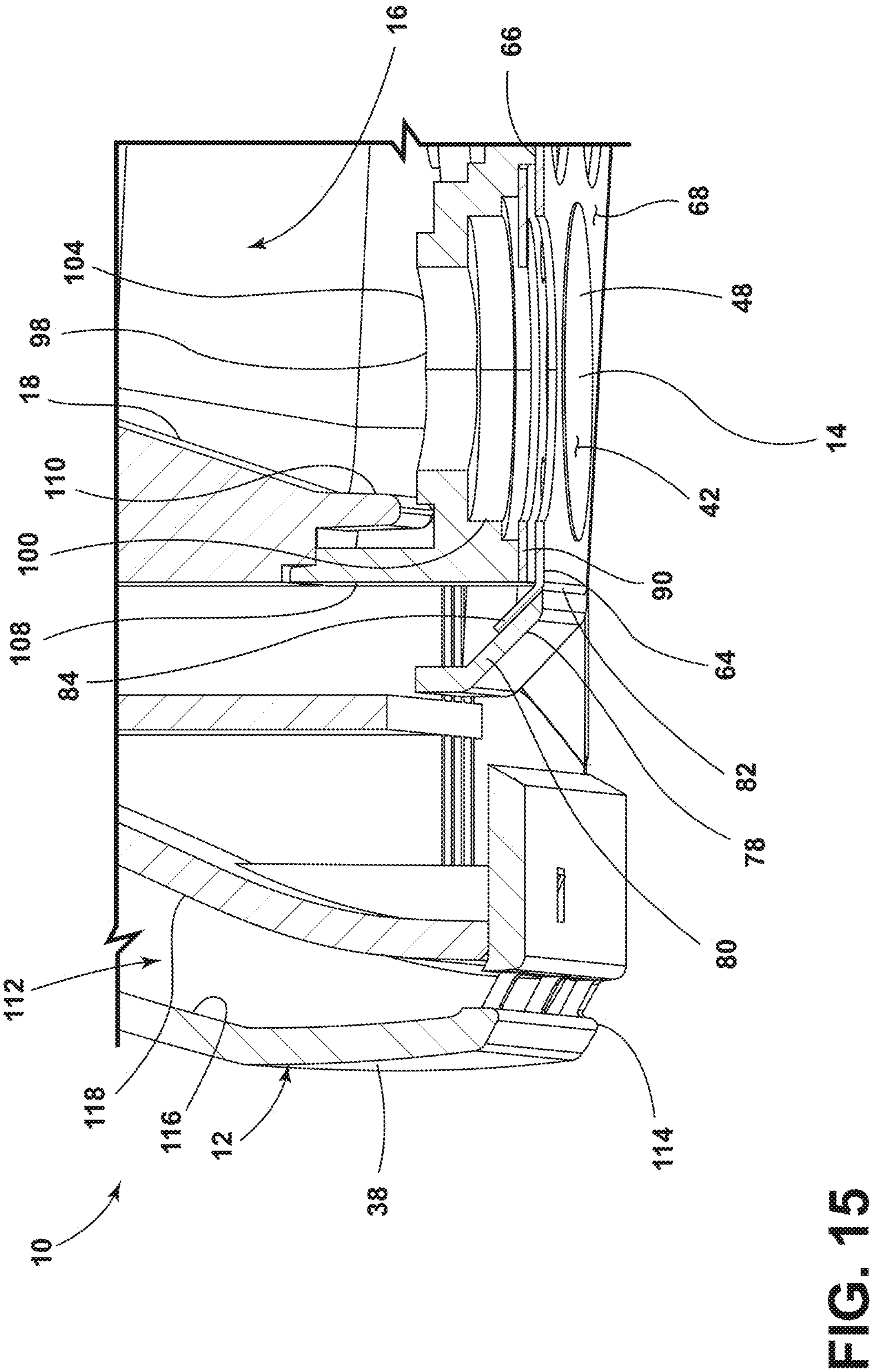
FIG. 15 is a magnified and slight perspective view of area XV of FIG. 6, illustrating a diameter of the aperture through the backboard decreasing in a stepwise manner in a direction away from the piezoelectric element associated with the aperture (it is noted that the piezoelectric element is not illustrated for simplicity)
Figure 16:
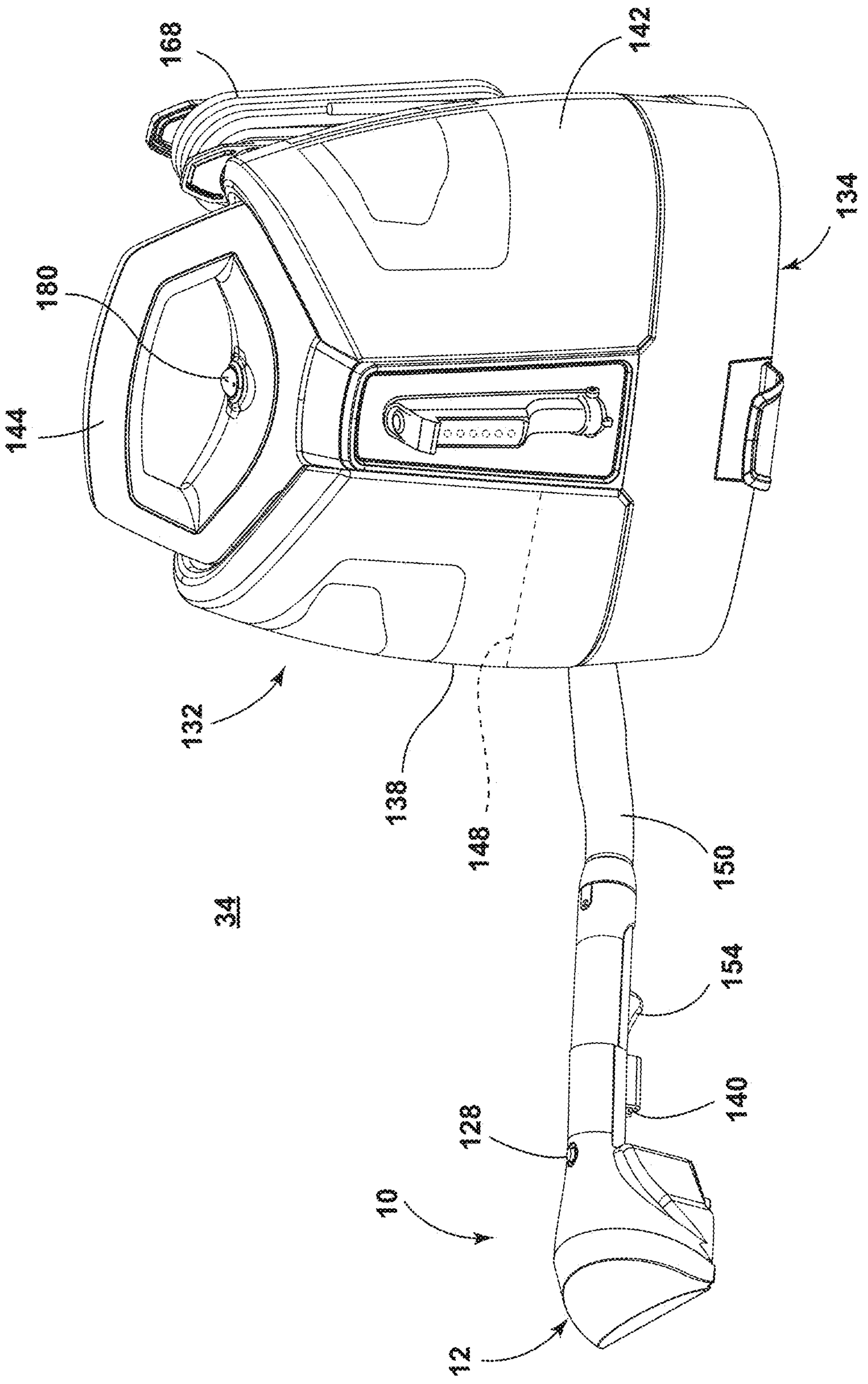
FIG. 16 is a perspective view of an extraction cleaner of the present disclosure, illustrating the suction head of FIG. 1 attached to a flexible hose of the extraction cleaner and the extraction cleaner further including a main housing supporting both a first fluid storage container and a second fluid storage container.
Figure 17:
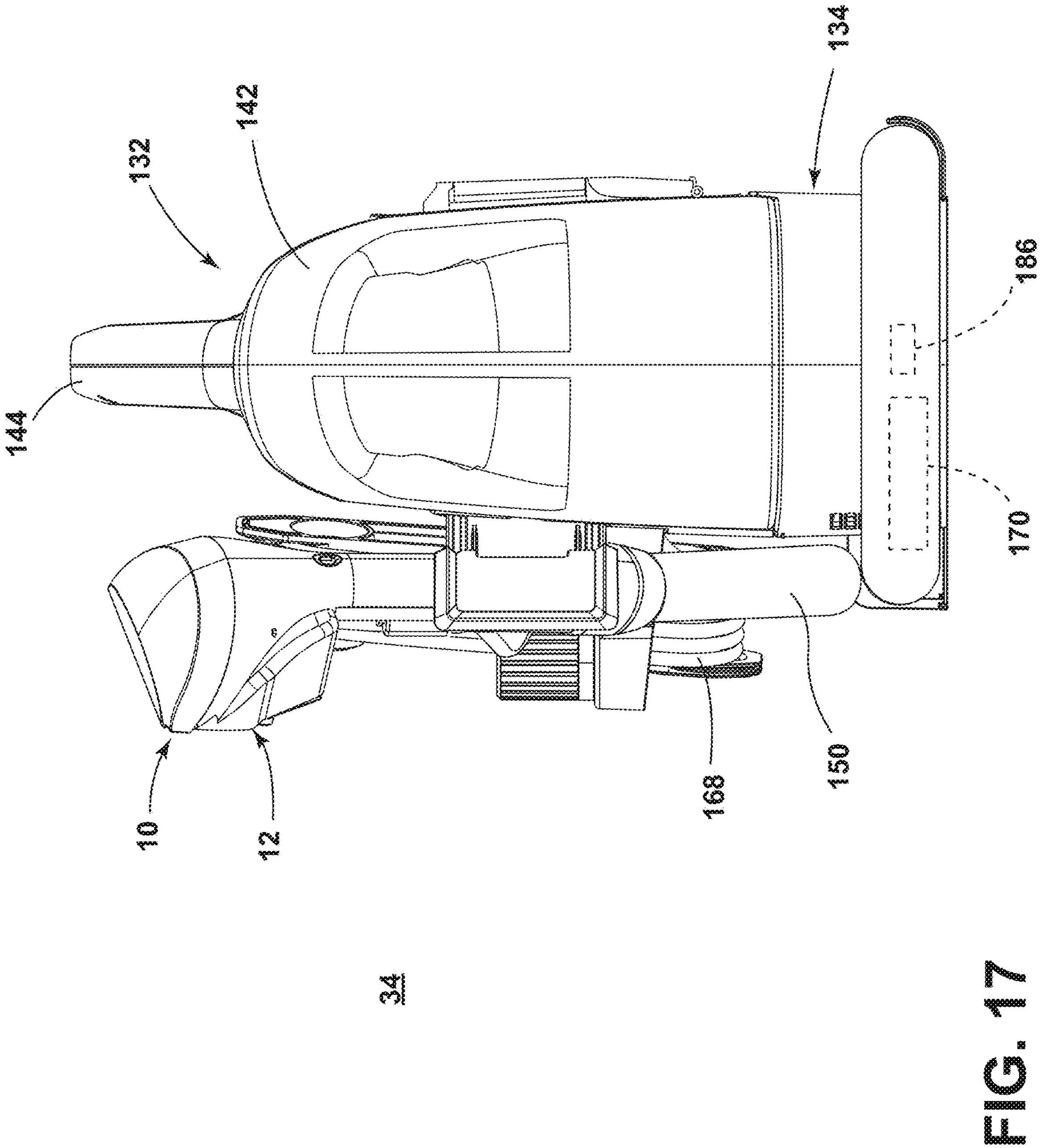
FIG. 17 is a side elevation view of the extraction cleaner of FIG. 16.
Figure 18:
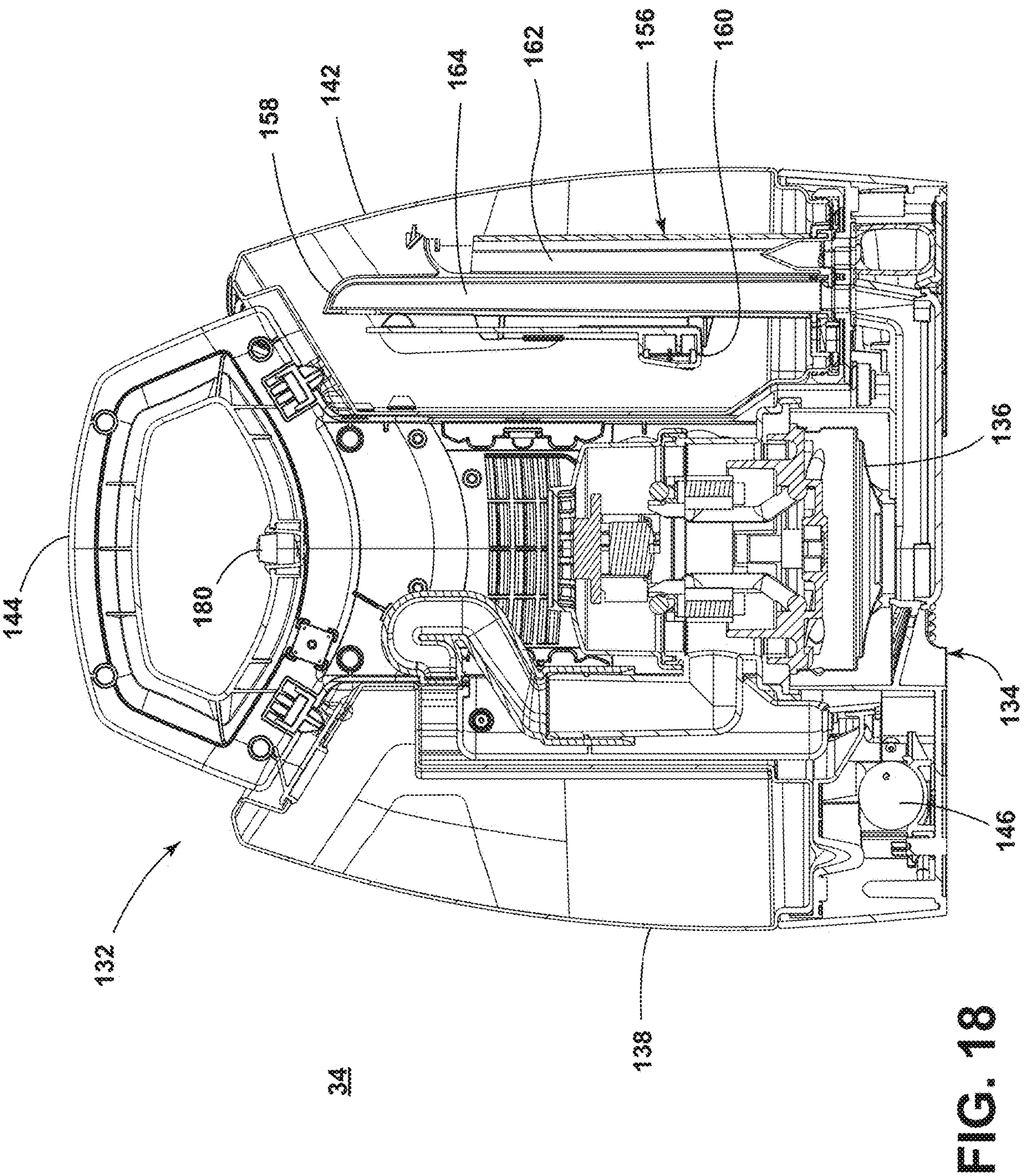
FIG. 18 is an elevation view of a cross-section of the extraction cleaner of FIG. 16 taken through line XVIII-XVIII of FIG. 17, illustrating the extraction cleaner further including (i) a suction source in fluid communication with the suction outlet of suction head and the second fluid storage container and (ii) a pump in fluid communication with a fluid distributor of the suction head and the first fluid storage container.
Figure 19:
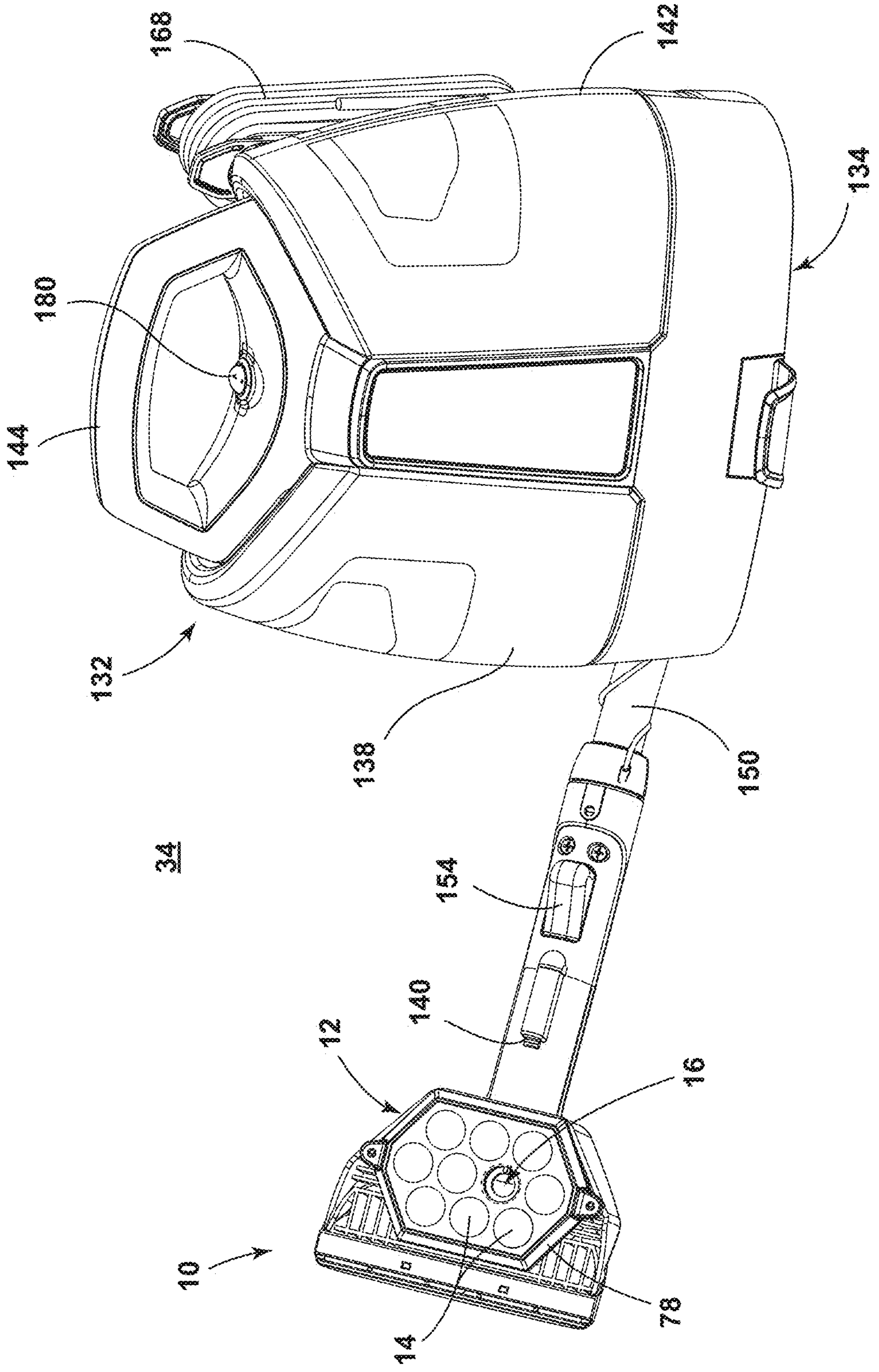
FIG. 19 is a perspective view of the extraction cleaner of FIG. 16 illustrating the fluid distributor of the suction head and the flexible hose including an actuator to actuate the pump to cause fluid from the first fluid storage container to be expelled out the fluid distributor onto a fabric-presenting product to be cleaned with the fluid.

In embodiments, such as that illustrated, the backboard 98 further includes projections 101 (see FIG. 12). The projections 101 are positioned to extend through cooperating apertures through the flexible backing 90 and contact the bracket 64. The projections 101 maintain separation between the backboard 98 and the bracket 64, which facilitates airflow therebetween around the plurality of piezoelectric element 14. The airflow in turn carries away the micronized liquid along the fluid flow path 62 as described.

In embodiments, such as that illustrated, the base 12 further defines a second suction chamber 112 and an inlet 114 into the second suction chamber 112 from the external environment 34. The inlet 114 is in fluid communication with second suction chamber 112, which is in fluid communication with the suction outlet 26. A second fluid flow path 115 is defined from the external environment 34, through the inlet 114, then through the second suction chamber 112 to the suction outlet 26 where the second fluid flow path 115 joins the fluid flow path 62 from the suction chamber 16. For example, the base 12 includes opposing surfaces 116, 118 (see, e.g., FIG. 6) that are separated from each other to define the second suction chamber 112.

The suction head 10 advantageously positions the piezoelectric element 14 (or the plurality of piezoelectric elements 14) so that the second surface 42 thereof can contact the fabric-presenting product. For example, the second surface 42 of the piezoelectric element 14 forms a plane 120, and the second surface 42 of each of the plurality of piezoelectric elements 14 can be coplanar with the plane 120. From the perspective of the suction head 10 being placed on a horizontal fabric-presenting product, with the second surface 42 of each of the plurality of piezoelectric elements 14 facing the fabric-presenting product, the suction chamber 16, the second suction chamber 112, the inlet 114 into the second suction chamber 112, and the suction outlet 26 are all disposed elevationally above the plane 120. In other embodiments, however, the base 12 can position the piezoelectric elements 14 so that the second surface 42 of each of the plurality of piezoelectric elements 14 are separated from the fabric-presenting product.

The suction head 10 can position the piezoelectric element 14 (or the plurality of piezoelectric elements 14, as the case may be) laterally between the inlet 114 into the second suction chamber 112 and the suction outlet 26. For example, from the perspective of FIG. 6, the inlet 114 is forward 122 of the piezoelectric element 14, which is forward 122 of the suction outlet 26. Stated another way, a plane 124 that is perpendicular to both the second surface 42 of the piezoelectric element 14 and a midline 126 (see FIG. 2) of the suction head 10 (that conceptually divides the suction head 10 into two substantially symmetrical halves) extends between the inlet 114 into the second suction chamber 112 and the suction outlet 26.

Figure 3:
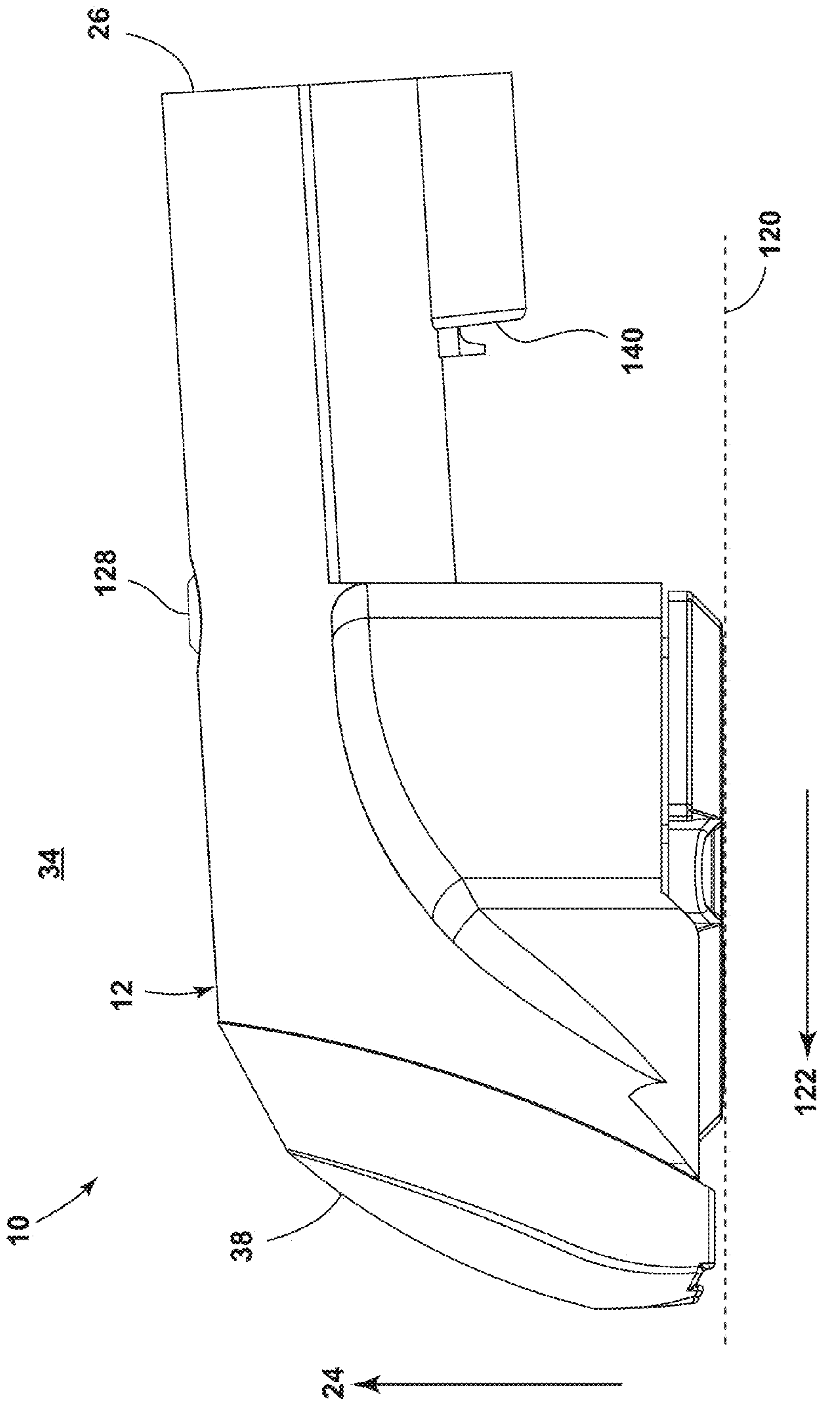
FIG. 3 is a side elevation view of the suction head of FIG. 1, illustrating the suction head further including a suction outlet through which captured fluid flows when the suction head is operably connected to a suction source.
Figure 4:
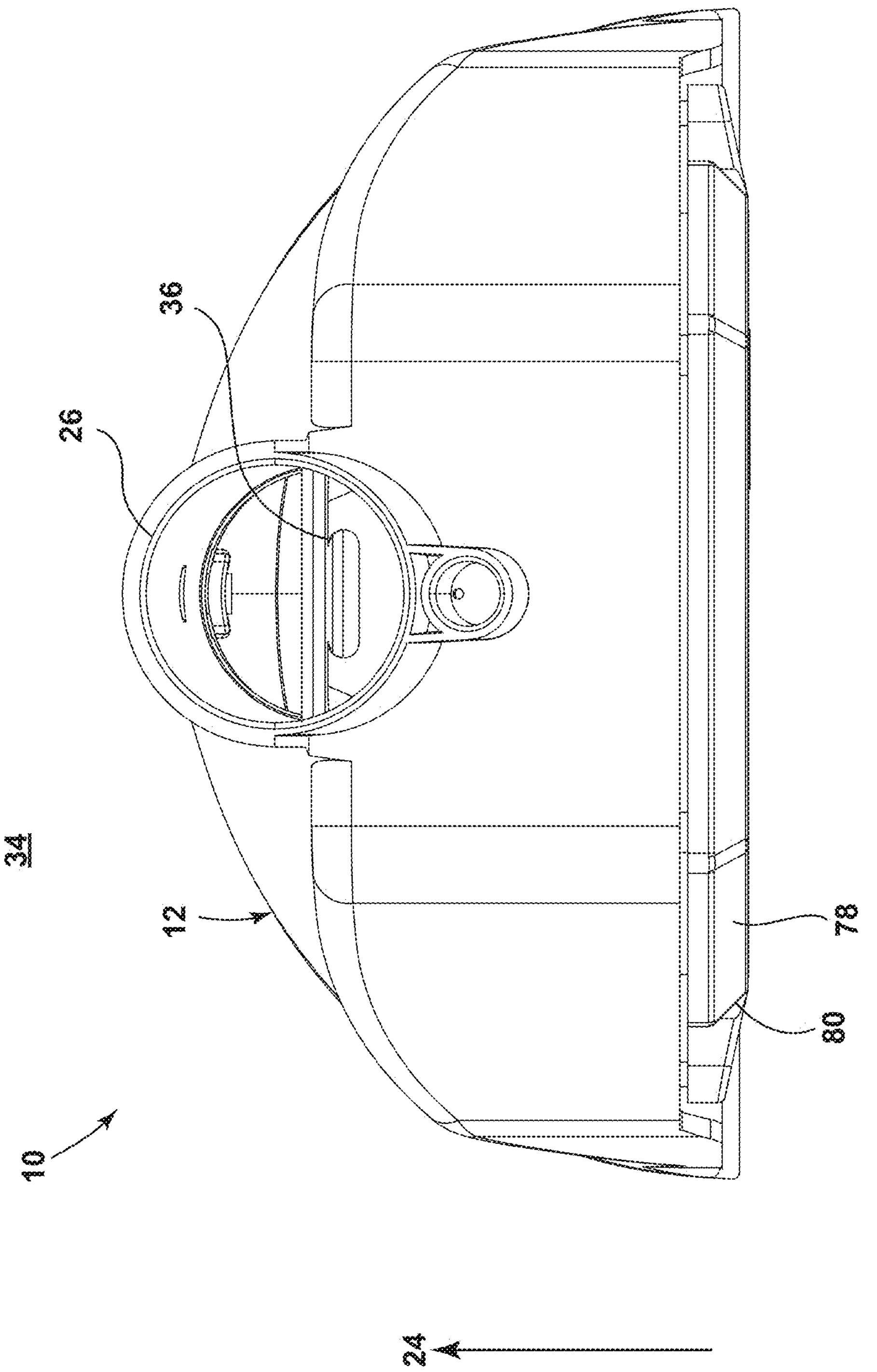
FIG. 4 is a rear elevation view of the suction head of FIG. 1, illustrating the suction head further including a base to which an outer bracket is attached.
Figure 5:
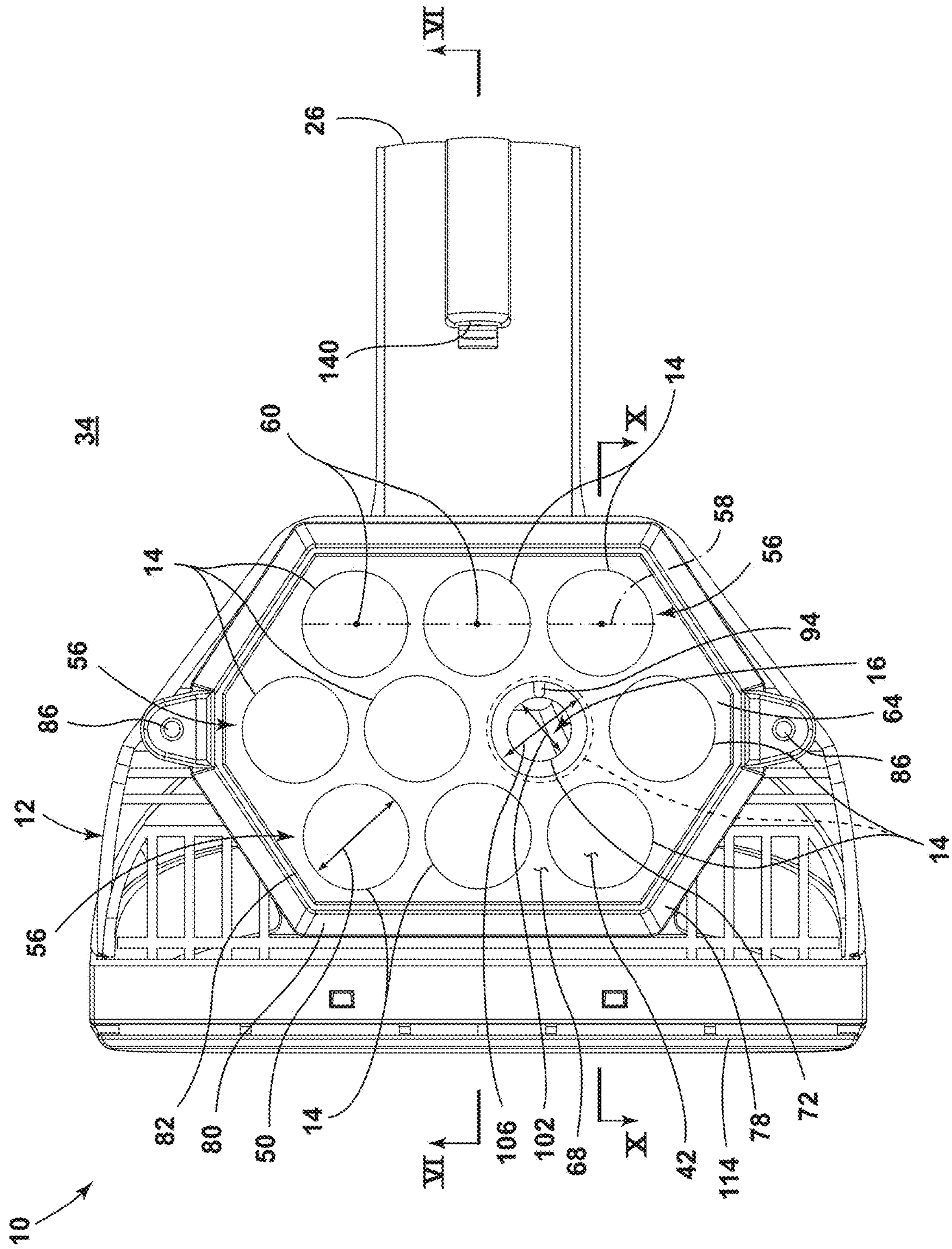
FIG. 5 is a bottom view of the suction head of FIG. 1, illustrating the suction head further including a plurality of piezoelectric elements extending through apertures of the outer bracket (with one of the piezoelectric elements illustrated in phantom view) and with a surface exposed to an external environment and separating the external environment from a suction chamber that the base forms.

The suction head 10 can further include an ON/OFF switch 128 (see, e.g., FIG. 3). The ON/OFF switch 128 is in electrical communication with the piezoelectric element 14 (or the plurality of piezoelectric elements 14, as the case may be). With the ON/OFF switch 128, a user can selectively activate or deactivate the piezoelectric element 14. The lead wires 53 can provide the electrical communication between the ON/OFF switch 128 and the piezoelectric element 14. When the suction head 10 includes the ON/OFF switch 128, the base 12 can further include an aperture 130 through which the ON/OFF switch 128 at least partially extends to be available for user manipulation from the external environment 34.

The suction head 10 may be used with, or a component of, an extraction cleaner 132, a portable example of which is illustrated at FIGS. 16-20. In addition to the suction head 10, the extraction cleaner 132 includes a main housing 134, a suction source 136, a first fluid storage container 138, a fluid distributor 140, and a second fluid storage container 142. The main housing 134 can include a handle 144 to facilitate the user transporting the extraction cleaner 132 closer to the fabric-presenting product to be cleaned. The main housing 134 can further include a base 12, upon which the first fluid storage container 138 and the second fluid storage container 142 may be removably mounted. The main housing 134 can house the suction source 136, which is illustrated as a motor and fan assembly, and a pump 146 for use with the fluid distributor 140.

The first fluid storage container 138 is configured to hold a fluid 148. For example, the first fluid storage container 138 can be a blow-molded plastic reservoir. The fluid 148 can be a cleaning fluid. For example, the fluid 148 that the first fluid storage container 138 holds can be water, detergent (e.g., surfactant(s), odor eliminators, sanitizers, surface conditioners, stabilizers, and mixtures thereof, among other options. The previous list is not exclusive. The first fluid storage container 138 is refillable.

The fluid distributor 140, as illustrated, can be disposed at the suction head 10. The fluid distributor 140 is in fluid communication with the first fluid storage container 138. For example, the extraction cleaner 132 can further include a flexible hose 150. The suction head 10 is selectively attachable and detachable from the flexible hose 150. The flexible hose 150 includes an internal fluid conduit 152 that is in fluid communication with the first fluid storage container 138. When the suction head 10 is attached to the flexible hose 150, the fluid distributor 140 is placed in fluid communication with the internal fluid conduit 152 of the flexible hose 150 and thus the first fluid storage container 138. The pump 146 is in fluid communication with both the fluid distributor 140 and the first fluid storage container 138. The pump 146 causes the fluid 148 from the first fluid storage container 138 to be expelled from the fluid distributor 140 onto the fabric-presenting product. The flexible hose 150 can include an actuator 154 in electrical communication with the pump 146 that, when manipulated, activates the pump 146 to expel the fluid 148. The main housing 134 may further include a heater (not illustrated) to heat the fluid 148 from the first fluid storage container 138 before the fluid 148 is expelled.

The second fluid storage container 142 is configured to hold fluid 148 as well. For example, the second fluid storage container 142 can be a blow-molded plastic reservoir. The fluid 148 that the second fluid storage container 142 holds can be fluid 148 extracted from the fabric-presenting product. The second fluid storage container 142 is in fluid communication with the suction source 136. The suction source 136 can be placed downstream from the second fluid storage container 142.

The second fluid storage container 142 can include an air/liquid separator assembly 156. A purpose of the air/liquid separator assembly 156 is to separate the fluid 148 into its constituent air and liquid components. The air/liquid separator assembly 156 comprises a stack 158 for the fluid 148 through the second fluid storage container 142 and a float assembly 160 for selectively closing the extraction path through the second fluid storage container 142. The stack 158 includes an inlet conduit 162 that receives the fluid 148 from the suction head 10 and opens into the interior of the second fluid storage container 142, and an outlet conduit 164 that passes substantially clean air, and substantially no liquid, to the suction source 136. The separated liquid remains in the second fluid storage container 142.

The suction outlet 26 of the suction head 10 is in fluid communication with the suction source 136 and the second fluid storage container 142. For example, the flexible hose 150 includes a conduit 166 that is in fluid communication with the suction source 136 and the second fluid storage container 142. When the suction head 10 is attached to the flexible hose 150, the suction outlet 26 of the suction head 10 is in fluid communication with the conduit 166 of the flexible hose 150. The fluid flow path 62 as described above for the suction head 10 thus continues through the conduit 166 of the flexible hose 150 to the second fluid storage container 142.

The flexible hose 150 can place the ON/OFF switch 128 and thus the piezoelectric element 14 in electrical communication with a power source. The power source can be mains power accessed via a cord 168 of the extraction cleaner 132. Alternatively, the power source can be a battery 170 housed in the main housing 134 of the extraction cleaner 132. The suction head 10 and the flexible hose 150 can include mating electrical connectors 172, 174 (see FIG. 20), respectively, which are placed in electrical communication when the suction head 10 is attached to the flexible hose 150. As another alternative, the suction head 10 can further include a battery 176, which can be replaceable and/or rechargeable, that is in electrical communication with both the ON/OFF switch 128 and the piezoelectric element 14. The inclusion of the battery 176 can render the electrical connectors 172, 174 unnecessary.

Figure 21:
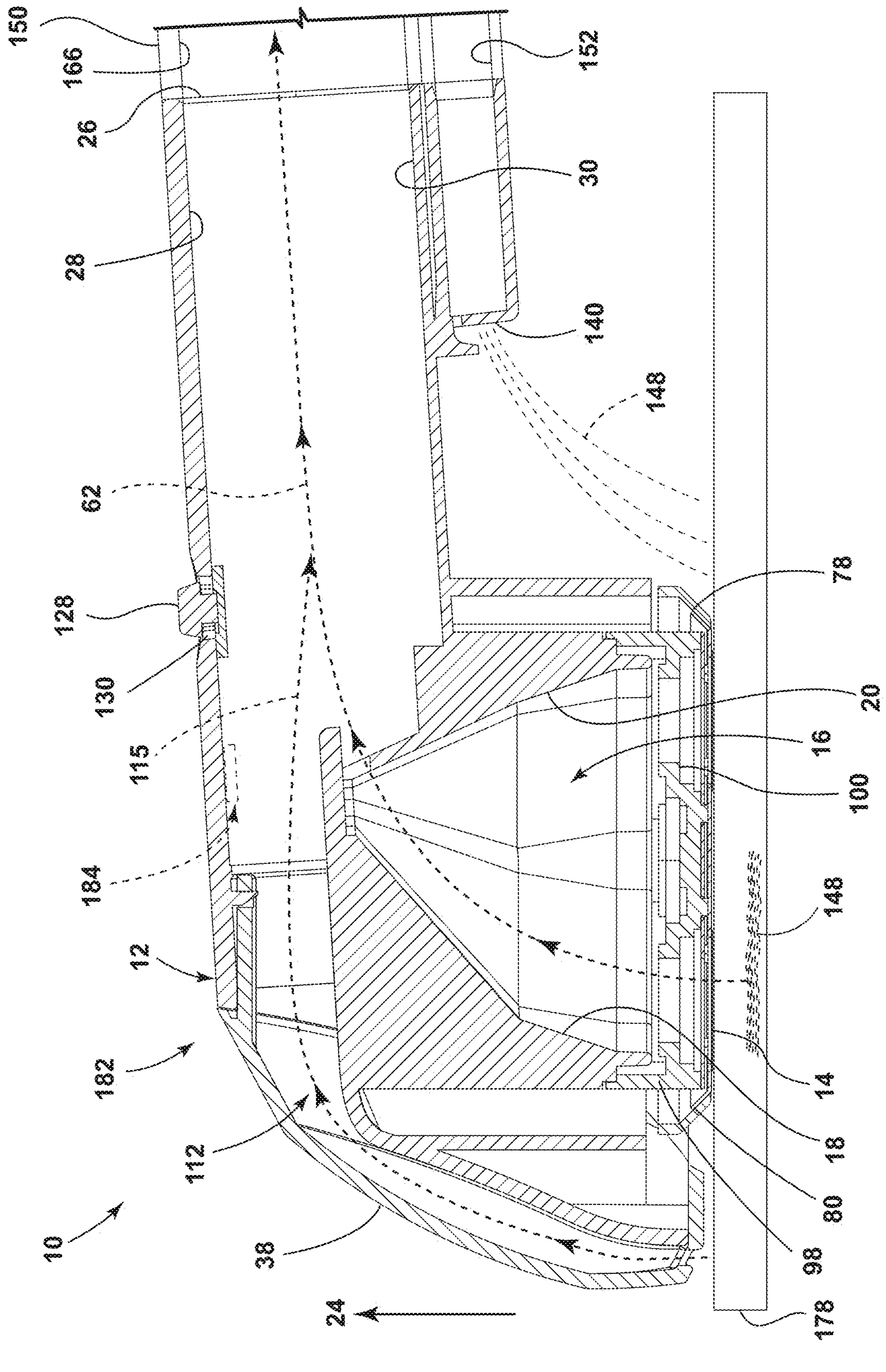
FIG. 21 is cross-sectional view of the suction head similar to FIG. 6 but this time illustrating the suction head attached to the flexible hose and the suction source of the extraction cleaner activated so that fluid is extracted from the fabric-presenting product and flows along the fluid flow path into a conduit of the flexible hose toward the second fluid storage container.

Referring to FIG. 21, in use, the user moves the extraction cleaner 132 near a fabric-presenting product 178 that the user desires to be deeply cleaned. The user takes hold of the suction head 10 or the flexible hose 150 near the suction head 10. The user manipulates the actuator 154 to cause the pump 146 to distribute the fluid 148 from the first fluid storage container 138 through the fluid distributor 140 onto the fabric-presenting product 178. The user can then scrub the fabric-presenting product 178, such as with bristles (not illustrated) disposed on the suction head 10 or elsewhere. Alternatively, or in addition, the user can manipulate the ON/OFF switch 128 to activate the piezoelectric element 14 (or the plurality of piezoelectric elements 14, as the case may be). The resulting high frequency vibrations agitate the fabric-presenting product 178 and the fluid 148 deposited thereupon. The agitation can release dirt within the fabric-presenting product 178.

After (or before) the fabric-presenting product 178 is suitably scrubbed, the user can activate the suction source 136 of the extraction cleaner 132, such as by pressing a switch 180 on the housing. When both the suction source 136 and the piezoelectric element 14 are activated, the extraction cleaner 132 is in an activated state 182. While in the activated state 182, the fluid 148 (now including dirt taken from the fabric-presenting product 178), is caused to flow because of the suction along the fluid flow path 62 from the fabric-presenting product 178, through the through-via 46 (or plurality of through-vias 46) of the piezoelectric element 14 (or the plurality of piezoelectric elements 14), through the suction chamber 16 of the base 12 of the suction head 10, through the conduit 166 of the flexible hose 150, and into the second fluid storage container 142. The high frequency vibration from the piezoelectric element 14 (i) withdraws fluid 148 from the fabric-presenting product 178 and (ii) converts liquid of the fluid 148 into fine mist particles with diameters ranging from 10 μm to 100 μm.

In embodiments of the suction head 10 that includes the second suction chamber 112, when the extraction cleaner 132 is in the activated state 182, the fluid 148 additionally flows from the fabric-presenting product 178 through the inlet 114 of the base 12 and into the second suction chamber 112. The user may have to slightly tilt the suction head 10 so that the inlet 114 contacts the fabric-presenting product 178. The fluid 148 from the suction chamber 16 and the second suction chamber 112 join and flow combined through the suction outlet 26, through the conduit 166 of the hose, and into the second fluid storage container 142.

The transformation of the liquid from the fluid 148 into fine mist particles is thought to quicken extraction of the fluid 148 from the fabric-presenting product 178. That leads to the fabric-presenting product 178 drying faster than if the piezoelectric element 14 had not been activated and suction alone was relied upon. The suction head 10 provides a sort of "drying multiplier" effect where the suction source 136 drawing in fluid 148 from the inlet 114 into the second suction chamber 112 extracts potentially a relatively large percentage of the fluid 148 from the fabric-presenting product 178 while the piezoelectric element 14 supplements the extraction by pulling and micronizing additional fluid from the fabric-presenting product 178 that suction alone was unable to extract. Surface tension may cause some of the fluid 148 within the fabric-presenting product 178 to resist extraction via suction alone. The vibrations from the piezoelectric element 14 can overcome the surface tension and liberate the fluid 148 from the fabric-presenting product 178 and allow the same to be extracted therefrom.

In another possible use scenario, the user can utilize the suction source 136 without activating the piezoelectric element 14 to extract much of the fluid 148 from the fabric-presenting product 178. The user can then activate the piezoelectric element 14 while maintaining activation of the suction source 136 to extract additional fluid 148. The user can judge whether the suction source 136 alone has ceased extracting fluid 148 from the fabric-presenting product 178 visually through the portions of the base 12 of the suction head 10 that are transparent. Alternatively, the suction head 10 can include a moisture sensor 184 in communication with a controller 186 (either located at the suction head 10 or the main housing 134 of the extraction cleaner 132). Once the controller 186 determines, as a function of signals received from the moisture sensor 184, that a predetermined minimum level has been achieved, the controller 186 can then activate the piezoelectric element 14.

The suction source 136 can be operable, for the activated state 182, at at least two power levels. When operated at one of the power levels, the suction source 136 generates less suction at the suction head 10 and generates less audible noise than when operated at the other of the at least two power levels. For example, the power levels can be a "high" power and a "low" power, where "high" and "low" mean only relative to each other.

Further, the user can cause only the piezoelectric element 14 (or plurality of piezoelectric elements 14) to be activated without simultaneously activating the suction source 136. The high frequency vibrations transform the liquid of the fluid 148 upon and within the fabric-presenting product 178 into mist, which floats due to air currents within the external environment 34 away from the fabric-presenting product 178. This mode of operation can be useful where the user desires very low levels of audible noise. The user may leave the suction head 10 with the piezoelectric element 14 upon the fabric-presenting product 178 in an activated state 182 and let the piezoelectric element 14 cause the fabric-presenting product 178 unattended. This mode of operation can be useful when the fluid 148 upon the fabric-presenting product 178 is relatively clean water and when capture of soiled cleaning fluid is unnecessary.

The suction head 10 and extraction cleaner 132 of the present disclosure addresses the aforementioned problems, in at least several ways. First, regarding the problem of extraction cleaners extracting a suboptimal percentage of the fluid 148 from the fabric-presenting product 178, the extraction cleaner 132 incorporating the suction head 10 of the present disclosure with the piezoelectric element 14 extracts a greater volume of the fluid 148 compared to if the piezoelectric element 14 was not included. Thus, less dirt remains on the fabric-presenting product 178 with the non-extracted fluid 148, and the fabric-presenting product 178 dries faster, compared to if the piezoelectric element 14 was not included. The faster drying provides an added benefit of increasing energy efficiency of the extraction cleaner 132 to achieve a certain level of dryness. Second, regarding the problem of extraction cleaners generating a suboptimal level of noise, the extraction cleaner 132 of the present disclosure includes a suction source 136 that can be operated at more than one power level including a relatively low power level. Although the suction source 136 is operated at a relatively low power level, the incorporation of the piezoelectric element 14 draws cleaning fluid from the fabric-presenting product 178 and transforms it to mist that is moved to and collected within the second fluid storage container 142. Without the piezoelectric element 14, the suction source 136 operating at the relatively low power level would be unable to extract as much of the fluid 148.

Although the suction head 10 has been described herein thus far in terms of an attachable/detachable component of the extraction cleaner 132, the suction head 10 can be an integral component of the extraction cleaner 132, such as permanently attached to the flexible hose 150. Further, although the disclosure described the extraction cleaner 132 in terms of a portable extraction cleaner, the extraction cleaner 132 could just as well be an upright extraction cleaner or a handheld extraction cleaner. In the instance of the handheld extraction cleaner 132, the body of the suction head 10 may be provided by the main housing 134 as an integrated unit.

Figure 22:
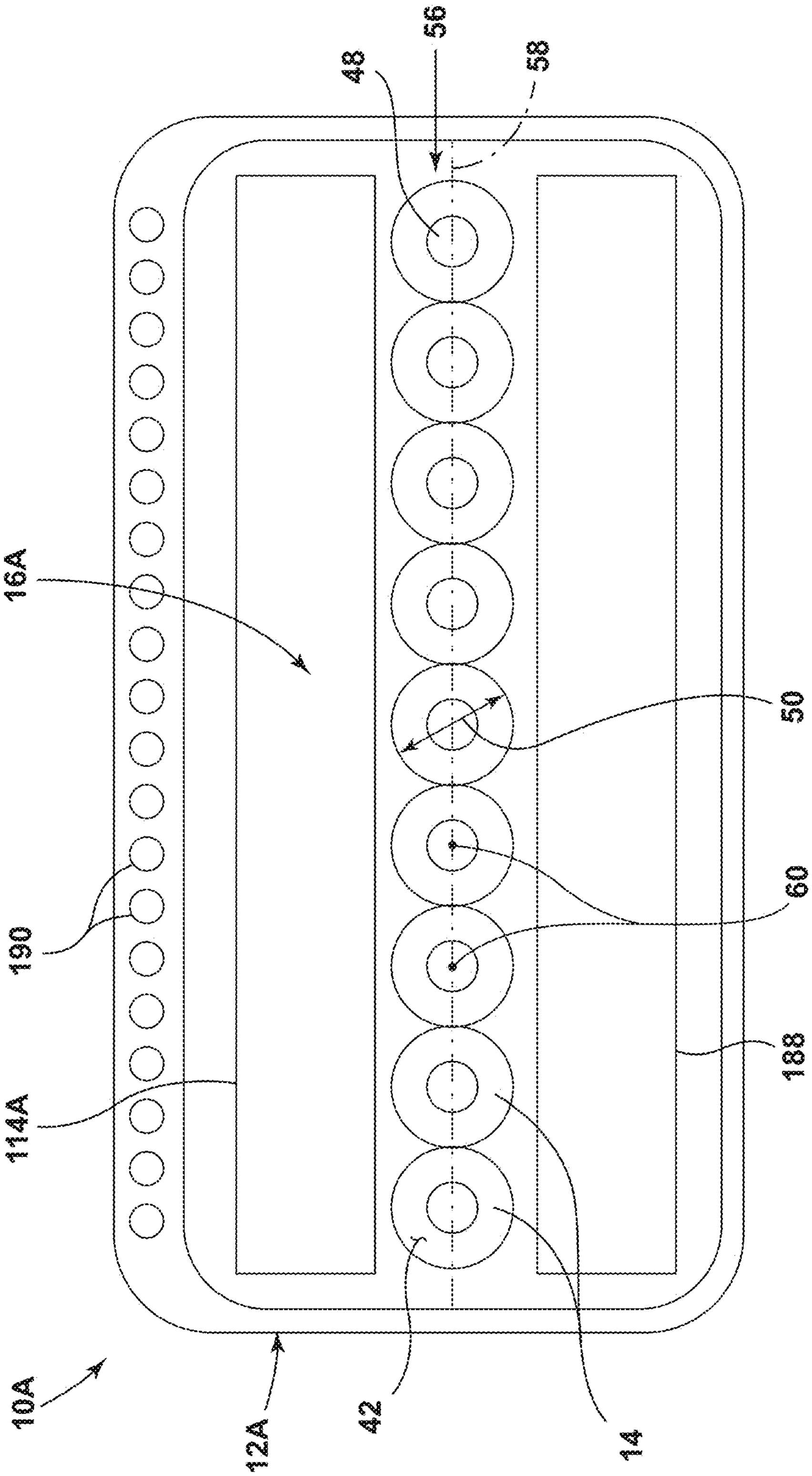
FIG. 22 is an underneath plan view of another suction head of the present disclosure, illustrating the suction head including a plurality of piezoelectric elements aligned in a row and disposed between an inlet and a second inlet into the suction chamber.

The suction head 10 can take different shapes and forms than have been described herein, and the piezoelectric elements 14 can nevertheless be positioned to contact the fabric-presenting product 178 to facilitate extraction of the fluid 148 therefrom. For example, in reference to FIG. 22, a suction head 10A includes a plurality of piezoelectric elements 14 aligned in a row 56 held therein by a base 12A. The suction head 10A further includes an inlet 114A into a suction chamber 16A and a second inlet 188 into the suction chamber 16A. The plurality of piezoelectric elements 14 are disposed between the inlet 114 and the second inlet 188, and the row 56 is parallel to both the inlet 114A and the second inlet 188. The suction head 10A further includes agitators 190 in the form of bristles.

EXAMPLES

Example 1—For Example 1, 56 grams of water was added to fabric-presenting product, in particular a carpet. A suction head not of the present disclosure (e.g., not including a piezoelectric element) was attached to a suction source. The suction head with the suction source activated was then passed over the carpet in a single extraction stroke. A down force of 8.1 pounds was applied to the suction head during the single extraction stroke. After the single extraction stroke, 18.8 grams of water remained on the carpet, meaning that the single extraction stroke had extracted 66.38% of the water initially added to the fabric-presenting product.

The suction head not of the present disclosure was then replaced with a suction head of the present disclosure including a plurality of piezoelectric elements. Both the plurality of piezoelectric elements and the suction source were activated. The suction head was then passed over the carpet in four extraction strokes. The same down force of 8.1 pounds was applied during the extraction strokes. After the four extraction strokes, 18.2 grams of water remained in the carpet, meaning that the suction head extracted an additional 3.61% of the water initially added to the carpet.

Example 2—For Example 2, 53.2 grams of water was added to a fabric-presenting product, in particular, a cushion similar to that used on a typical couch. The weight of water remaining as a function of time was measured. From the measured weight, the volume of water lost due to evaporation was calculated to provide a baseline. After 5 minutes, 1.8 mL of water had evaporated.

Figure 23:
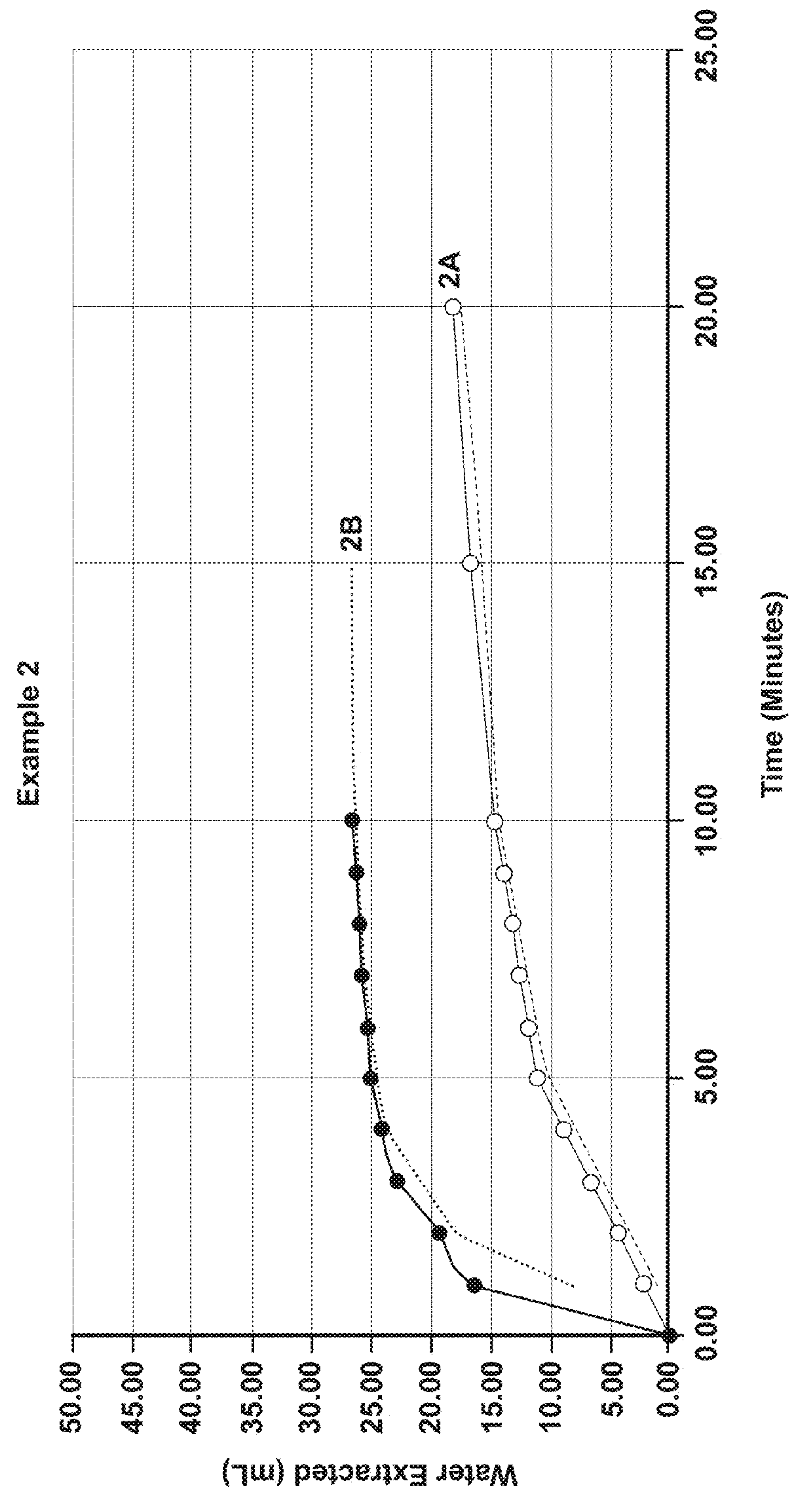
FIG. 23, pertaining to an Example 2, is a graph plotting a volume of water extracted from a fabric-presenting product as a function of time using a suction head of the present disclosure that included one piezoelectric element (line 2A) and a suction head of the present disclosure that included ten piezoelectric elements (line 2B), the latter of which having extracted more water.

Next, about 50 grams of water was added to another cushion. A suction head of the present disclosure with a single piezoelectric element was then applied to the couch with a down force of 600 grams. A suction source was not activated to determine the extraction capability of the single piezoelectric element alone. The weight of water remaining as a function of time was measured. From the measured weight, the volume of water extracted was calculated. The volume of water extracted was then plotted as a function of time in the graph reproduced at FIG. 23. The line 2A represents the data for the single piezoelectric element. After 5 minutes, for example, the single piezoelectric element extracted 11.1 mL of water from the cushion, which is a marked increase over the 1.8 mL baseline of evaporative loss.

Next, about 50 grams of water was added to another cushion. A suction head of the present disclosure with a plurality of piezoelectric elements (specifically, ten piezoelectric elements) was then applied to the couch with a down force of 600 grams. A suction source was not activated to determine the extraction capability of the single piezoelectric element alone. The weight of water remaining as a function of time was measured. From the measured weight, the volume of water extracted was calculated. The volume of water extracted was then plotted as a function of time in the graph reproduced at FIG. 23. The line 2B represents the data for the ten piezoelectric elements. After 5 minutes, for example, the ten piezoelectric elements extracted 25.1 mL of water from the cushion, which is a marked increase over the 11.1 mL that the single piezoelectric element extracted.

The following Clauses provide representative configurations of suction heads and extraction cleaners as disclosed herein.

Clause 1: A suction head for an extraction cleaner comprising: (a) a base forming a suction chamber and a suction outlet in fluid communication with the suction chamber; and (b) a piezoelectric element coupled to the base, the piezoelectric element comprising a first surface open to the suction chamber, a second surface facing an external environment away from the suction chamber, a thickness between the first surface and the second surface, and a through-via through the thickness open at both the first surface and the second surface.

Clause 2: The suction head of Clause 1, wherein the base and the piezoelectric element define a fluid flow path from the external environment, through the through-via of the piezoelectric element, into the suction chamber, into the suction outlet, and then and out of the suction outlet of the base.

Claims 3: The suction head of any one of Clauses 1-2, wherein the piezoelectric element comprises a plurality of through-vias, each of which are through the thickness and open at both the first surface and the second surface.

Clause 4: The suction head of Clause 3, wherein the plurality of through-vias number within a range of from 1,000 to 2,000.

Clause 5: The suction head of any one of Clauses 3-4, wherein each of the plurality of through-vias of the piezoelectric element has a diameter that is within a range of from 5 μm to 20 μm.

Clause 6: The suction head of Clause 1 further comprising: a plurality of piezoelectric elements coupled to the base, of which the piezoelectric element is one, each of the plurality of piezoelectric elements comprising a first surface open to the suction chamber, a second surface facing an external environment and away from the suction chamber, a thickness between the first surface and the second surface, and a plurality of through-vias through the thickness open at both the first surface and the second surface, wherein, the base and the plurality of piezoelectric elements define a fluid flow path from the external environment, in through the plurality of through-vias of each of the plurality of piezoelectric elements, into the suction chamber, into the suction outlet, and then out of the suction outlet.

Clause 7: The suction head of any one of Clauses 1-6 further comprising: a bracket coupled to the base, the bracket comprising a first surface facing the suction chamber, a second surface facing the external environment, a thickness between the first surface and the second surface, and an aperture through the thickness that is open at the first surface and the second surface, wherein, an outer region of the first surface of the piezoelectric element lies flush against the second surface of the bracket, at least a portion of the piezoelectric element extends into the aperture of the bracket, and a portion of lead wires of the piezoelectric element extend adjacent to the first surface of the bracket.

Clause 8: The suction head of Clause 7 further comprising: a plurality of piezoelectric elements, of which the piezoelectric element is one, wherein, the bracket further comprises a plurality of apertures, of which the aperture is one, through the thickness that are open at the first surface and the second surface, and wherein, an outer region of each of the plurality of piezoelectric elements lie flush against the second surface of the bracket, at least a portion of each of the plurality of piezoelectric elements extend into the aperture of the bracket, and a portion of the lead wires of each of the plurality of piezoelectric elements extends adjacent to the first surface of the bracket.

Clause 9: The suction head of any one of Clauses 7-8 further comprising: an outer bracket attached to the base, the outer bracket comprising a shoulder that surrounds a central aperture, wherein, the shoulder contacts an outer flange of the bracket with the aperture through which the portion of the piezoelectric element extends to couple the bracket to the base.

Clause 10: The suction head of any one of Clauses 7-9 further comprising: a flexible backing disposed upon the first surface of the bracket, the flexible backing comprising (i) an aperture aligned with the aperture of the bracket and the piezoelectric element and (ii) a tab extending over the first surface of the piezoelectric element.

Clause 11: The suction head of Clause 10 further comprising: a backboard disposed upon the flexible backing the flexible backing, the backboard and the flexible backing sandwiched between the outer bracket and the base, the backboard comprising an aperture aligned with the aperture of the flexible backing, the aperture of the bracket, and the piezoelectric element, wherein at least a portion of the aperture of the backboard has a diameter that is smaller than a diameter of the aperture of the bracket.

Clause 12: The suction head of Clause 11, wherein the backboard comprises an outer wall extending away from the bracket, the outer wall facing a wall of the base at least partially defining the suction chamber.

Clause 13: The suction head of any one of Clauses 1-12, wherein (a) the base further defines (i) a second suction chamber that is in fluid communication with the suction outlet and (ii) an inlet into the second suction chamber from the external environment, and (b) the base defines a second fluid flow path from the external environment, through the inlet, through the second suction chamber, and joining the fluid flow path out through the suction outlet.

Clause 14: The suction head of Clause 13, wherein (i) the second surface of the piezoelectric element forms a plane, and (ii) the suction chamber, the second suction chamber, the inlet into the second suction chamber, and the suction outlet are all disposed elevationally above the plane.

Clause 15: The suction head of any one of Clauses 13-14, wherein a plane through the piezoelectric element that is perpendicular to (i) the second surface of the piezoelectric element and (ii) a midline of the suction head extends between the inlet into the second suction chamber and the suction outlet.

Clause 16: The suction head of claim 1 further comprising: an ON/OFF switch in electrical communication with the piezoelectric element, wherein, the base comprises an aperture through which the ON/OFF switch at least partially extends to be available for manipulation from the external environment.

Clause 17: An extraction cleaner comprising: (a) a main housing; (b) a suction source housed in the housing; (c) a first fluid storage container coupled to the main housing, the first fluid storage container configured to hold a fluid; (d) a fluid distributor in fluid communication with the first fluid storage container, the fluid distributor configured to deliver the fluid from the first fluid storage container to a fabric-presenting product; (e) a second fluid storage container coupled to the main housing and in fluid communication with the suction source, the second fluid storage container configured to hold the fluid extracted from the fabric-presenting product; (f) a suction head comprising a base forming a suction chamber and a suction outlet in fluid communication with the suction chamber, the second fluid storage container, and the suction source; and a piezoelectric element coupled to the base, the piezoelectric element comprising (i) a first surface open to the suction chamber, (ii) a second surface facing an external environment away from the suction chamber, (iii) a thickness between the first surface and the second surface, and (iv) a through-via through the thickness open at both the first surface and the second surface; and (g) an activated state during which (i) the piezoelectric element and the suction source are activated and (ii) fluid flows from an external environment, through the through-via of the piezoelectric element, through the suction chamber of the base of the suction head, and into the second fluid storage container.

Clause 18: The extraction cleaner of Clause 17, wherein (i) the base further comprises a plurality of piezoelectric elements coupled to the base, of which the piezoelectric element is one, each of the plurality of piezoelectric elements comprising a first surface open to the suction chamber, a second surface facing an external environment away from the suction chamber, a thickness between the first surface and the second surface, and a plurality of through-vias through the thickness open at both the first surface and the second surface, and (ii) during the activated state, fluid flows from the external environment through the through-vias of each of the plurality of piezoelectric elements, through the suction chamber of the base of the suction head, out the suction outlet, and into the second fluid storage container.

Clause 19: The extraction cleaner of any one of Clauses 17-18, wherein (a) the base further comprises (i) a second suction chamber that is in fluid communication with the suction outlet and (ii) an inlet into the second suction chamber from the external environment, (b) the second surface of the piezoelectric element forms a plane, (c) the suction chamber, the second suction chamber, the inlet into the second suction chamber, and the suction outlet are all disposed elevationally above the plane, and (d) during the activated state, fluid flows from the external environment simultaneously through (i) the through-via of the piezoelectric element, through the suction chamber of the base of the suction head, and into the suction outlet and (ii) the inlet of the base, through the second suction chamber, and into the suction outlet, and then the fluid from the suction chamber and the second suction chamber flows combined through the suction outlet and into the second fluid storage container.

Clause 20: The extraction cleaner of any one of Clauses 17-19, wherein the suction source is operable, for the activated state, at at least two power levels, one of which utilizes less power and generates less audible noise than the other than the other.

What is claimed is:

1. A suction head for an extraction cleaner comprising:

a base forming a suction chamber and a suction outlet in fluid communication with the suction chamber;

a piezoelectric element coupled to the base, the piezoelectric element comprising a first surface open to the suction chamber, a second surface facing an external environment away from the suction chamber, a thickness between the first surface and the second surface, and a through-via through the thickness open at both the first surface and the second surface; and a backboard sandwiched between a bracket and the base, the backboard comprising an aperture aligned with an aperture of the bracket and the piezoelectric element, wherein at least a portion of the aperture of the backboard has a diameter that is smaller than a diameter of the aperture of the bracket.

2. The suction head of claim 1, wherein the base and the piezoelectric element define a fluid flow path from the external environment, through the through-via of the piezoelectric element, into the suction chamber, into the suction outlet, and then and out of the suction outlet of the base.

3. The suction head of claim 2, wherein the base further defines: (i) a second suction chamber that is in fluid communication with the suction outlet and (ii) an inlet into the second suction chamber from the external environment, and the base defines a second fluid flow path from the external environment, through the inlet, through the second suction chamber, and joining the fluid flow path out through the suction outlet.

4. The suction head of claim 3, wherein the second surface of the piezoelectric element forms a plane, and the suction chamber, the second suction chamber, the inlet into the second suction chamber, and the suction outlet are all disposed elevationally above the plane.

5. The suction head of claim 3, wherein a plane through the piezoelectric element that is perpendicular to (i) the second surface of the piezoelectric element and (ii) a midline of the suction head extends between the inlet into the second suction chamber and the suction outlet.

6. The suction head of claim 1, wherein the piezoelectric element comprises a plurality of through-vias, each of which is through the thickness and open at both the first surface and the second surface.

7. The suction head of claim 6, wherein the plurality of through-vias number within a range of from 1,000 to 2,000.

8. The suction head of claim 7, wherein each of the plurality of through-vias of the piezoelectric element has a diameter that is within a range of from 5 μm to 20 μm.

9. The suction head of claim 1 further comprising:

a plurality of piezoelectric elements coupled to the base, of which the piezoelectric element is one, each of the plurality of piezoelectric elements comprising a first surface open to the suction chamber, a second surface facing the external environment and away from the suction chamber, a thickness between the first surface and the second surface of the piezoelectric element, and a plurality of through-vias through the thickness open at both the first surface and the second surface, wherein, the base and the plurality of piezoelectric elements define a fluid flow path from the external environment, in through the plurality of through-vias of each of the plurality of piezoelectric elements, into the suction chamber, into the suction outlet, and then out of the suction outlet.

10. The suction head of claim 1, wherein the bracket is coupled to the base, the bracket comprises a first surface facing the suction chamber, a second surface facing the external environment, a thickness between the first surface and the second surface of the bracket, the aperture of the bracket is through the thickness of the bracket, and the aperture of the bracket is open at the first surface and the second surface of the bracket, and an outer region of the first surface of the piezoelectric element lies flush against the second surface of the bracket, at least a portion of the piezoelectric element extends into the aperture of the bracket, and a portion of lead wires of the piezoelectric element extends adjacent to the first surface of the bracket.

11. The suction head of claim 10 further comprising:

a plurality of piezoelectric elements, of which the piezoelectric element is one, wherein, the bracket further comprises a plurality of apertures, of which the aperture is one, through the thickness that are open at the first surface and the second surface of the bracket, and wherein, an outer region of each of the plurality of piezoelectric elements lie-lies flush against the second surface of the bracket, at least a portion of each of the plurality of piezoelectric elements extends into the aperture of the bracket, and a portion of the lead wires of each of the plurality of piezoelectric elements extends adjacent to the first surface of the bracket.

12. The suction head of claim 10 further comprising:

an outer bracket attached to the base, the outer bracket comprising a shoulder that surrounds a central aperture, wherein, the shoulder contacts an outer flange of the bracket with the aperture through which the portion of the piezoelectric element extends to couple the bracket to the base.

13. The suction head of claim 1 further comprising:

an ON/OFF switch in electrical communication with the piezoelectric element, wherein, the base comprises an aperture through which the ON/OFF switch at least partially extends to be available for manipulation from the external environment.

14. The suction head of claim 1, wherein the diameter of the aperture of the backboard decreases in a stepwise manner away from the piezoelectric element.

15. An extraction cleaner comprising:

a main housing;

a suction source housed in the main housing;

a first fluid storage container coupled to the main housing, the first fluid storage container configured to hold a fluid;

a fluid distributor in fluid communication with the first fluid storage container, the fluid distributor configured to deliver the fluid from the first fluid storage container to a fabric-presenting product;

a second fluid storage container coupled to the main housing and in fluid communication with the suction source, the second fluid storage container configured to hold the fluid extracted from the fabric-presenting product; and a suction head comprising:

a base forming a suction chamber and a suction outlet in fluid communication with the suction chamber, the second fluid storage container, and the suction source;

a piezoelectric element coupled to the base, the piezoelectric element comprising (i) a first surface open to the suction chamber, (ii) a second surface facing an external environment away from the suction chamber, (iii) a thickness between the first surface and the second surface, and (iv) a through-via through the thickness open at both the first surface and the second surface; and a backboard sandwiched between a bracket and the base, the backboard comprising an aperture aligned with an aperture of the bracket and the piezoelectric element, wherein at least a portion of the aperture of the backboard has a diameter that is smaller than a diameter of the aperture of the bracket;

wherein, the extraction cleaner is configured to operate in an activated state during which (i) the piezoelectric element and the suction source are activated and (ii) fluid flows from the external environment, through the through-via of the piezoelectric element, through the suction chamber of the base of the suction head, and into the second fluid storage container.

16. The extraction cleaner of claim 15, wherein the base further comprises a plurality of piezoelectric elements coupled to the base, of which the piezoelectric element is one, each of the plurality of piezoelectric elements comprising a first surface open to the suction chamber, a second surface facing the external environment away from the suction chamber, a thickness between the first surface and the second surface of the piezoelectric element, and a plurality of through-vias through the thickness open at both the first surface and the second surface, and when the extraction cleaner is in the activated state, fluid flows from the external environment through the through-vias of each of the plurality of piezoelectric elements, through the suction chamber of the base of the suction head, out the suction outlet, and into the second fluid storage container.

17. The extraction cleaner of claim 15, wherein the base further comprises: (i) a second suction chamber that is in fluid communication with the suction outlet and (ii) an inlet into the second suction chamber from the external environment, the second surface of the piezoelectric element forms a plane, the suction chamber, the second suction chamber, the inlet into the second suction chamber, and the suction outlet are all disposed elevationally above the plane, and when the extraction cleaner is in the activated state, fluid flows from the external environment simultaneously through: (i) the through-via of the piezoelectric element, through the suction chamber of the base of the suction head, and into the suction outlet and (ii) the inlet of the base, through the second suction chamber, and into the suction outlet, and then the fluid from the suction chamber and the second suction chamber flows combined through the suction outlet and into the second fluid storage container.

18. The extraction cleaner of claim 15, wherein the suction source is operable, while the extraction cleaner is in the activated state, at at least two power levels, one of which utilizes less power and generates less audible noise than the other.

19. A suction head for an extraction cleaner comprising:

a base forming a suction chamber and a suction outlet in fluid communication with the suction chamber;

a piezoelectric element coupled to the base, the piezoelectric element comprising a first surface open to the suction chamber, a second surface facing an external environment away from the suction chamber, a thickness between the first surface and the second surface of the piezoelectric element, and a through-via through the thickness open at both the first surface and the second surface of the piezoelectric element;

a bracket coupled to the base, the bracket comprising:

a first surface facing the suction chamber, a second surface facing the external environment, a thickness between the first surface and the second surface of the bracket, and an aperture through the thickness that is open at the first surface and the second surface of the bracket, with at least a portion of the piezoelectric element extending into the aperture of the bracket; and a flexible backing disposed upon the first surface of the bracket, the flexible backing comprising: (i) an aperture aligned with the aperture of the bracket and the piezoelectric element and (ii) a tab extending over the first surface of the piezoelectric element.

20. The suction head of claim 15, wherein the piezoelectric element comprises (i) a diaphragm providing the first surface open to the suction chamber, the second surface facing the external environment away from the suction chamber, and the thickness through which the through-via extends and (ii) a piezoelectric material disposed on the first surface of the diaphragm, and an outer region of the diaphragm at the second surface of the diaphragm is entirely open to the external environment.

* * * * *